US010058107B2

(12) United States Patent
Hendriksen et al.

(10) Patent No.: US 10,058,107 B2
(45) Date of Patent: Aug. 28, 2018

(54) METHOD FOR PRODUCING A DAIRY PRODUCT

(71) Applicant: Novozymes A/S, Bagsvaerd (DK)

(72) Inventors: Hanne Vang Hendriksen, Holte (DK); Steffen Ernst, Broenshoej (DK); Reinhard Wilting, Farum (DK); Jeppe Wegener Tams, Gentofte (DK); Mette Oerhrstroem Runge, Snekkersten (DK); Helle Skov Guldager, Vedbaek (DK)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 15/433,642

(22) Filed: Feb. 15, 2017

(65) Prior Publication Data

US 2017/0156357 A1 Jun. 8, 2017

Related U.S. Application Data

(63) Continuation of application No. 12/744,508, filed as application No. PCT/EP2008/066624 on Dec. 2, 2008, now abandoned.

(60) Provisional application No. 61/055,164, filed on May 22, 2008, provisional application No. 60/992,783, filed on Dec. 6, 2007.

(30) Foreign Application Priority Data

Dec. 3, 2007 (EP) .................................. 07122110
May 21, 2008 (EP) .................................. 08156674

(51) Int. Cl.
*C12N 9/38* (2006.01)
*A23C 9/12* (2006.01)
*A23C 9/123* (2006.01)

(52) U.S. Cl.
CPC ............ *A23C 9/1206* (2013.01); *A23C 9/123* (2013.01)

(58) Field of Classification Search
CPC ...................... C12Y 302/01023; C12N 9/2471
USPC ...................... 435/207, 183, 252.3
See application file for complete search history.

(56) References Cited

U.S. PATENT DOCUMENTS

| 5,736,374 A | 4/1998 | Berka et al. |
| 7,081,355 B2 | 7/2006 | Jorgensen et al. |
| 2008/0286412 A1 | 11/2008 | Dekker et al. |

FOREIGN PATENT DOCUMENTS

| CN | 1807609 A | 7/2006 |
| CN | 1810161 A | 8/2006 |
| EP | 0026672 A2 | 8/1981 |
| EP | 0119329 A1 | 9/1984 |
| EP | 0323201 A2 | 7/1989 |
| EP | 1283876 B1 | 1/2007 |
| WO | 2001/090317 A2 | 11/2001 |
| WO | 02/81673 A1 | 10/2002 |
| WO | 2003/094623 A1 | 11/2003 |
| WO | 2007/021204 A1 | 2/2007 |
| WO | 2009/071539 A1 | 6/2009 |
| WO | 2013/182686 A1 | 12/2013 |

OTHER PUBLICATIONS

Jorgensen_et_al. (2001) Appl.Microbiol._Biotechnol. vol. 57,pp. 647-652.*
Kenward, Food Ingredients 1st, "Novozymes: SAPHERA Enables New Innovation in Lactose-Free, Fermented Dairy Products" (2016).
Chr. Hansen, Ha-lactase(TM) application sheet (2010).
Ismail, Journal of the Society of Dairy Technology, vol. 36, No. 2, pp. 52-55 (1983).
Broome et al., The Australian Journal of Diary Technology, pp. 35-37 (1983).
Goulas et al., Database Accession No. A4K5H9 pp. 1-2 (2007).
Ishmail et al., J. Society Dairy Technology, vol. 36, No. 2, pp. 52-55 (1983).
Jorgensen et al., Applied Microbiol Biotechnology, vol. 57, pp. 647-652 (2001).
Jurado et al., Enzyme and Microbiol Technology, vol. 34, pp. 33-40 (2004).
Kang et al., Enzyme and Microbiol Technology, vol. 37, pp. 655-662 (2005).
Ma et al., Science and Technology of Food Industry pp. 50-52 (2002).
Madsen et al., Database Accession No. Q9F4D5 pp. 1-2 ((2003).
Martinez-Villaluenga et al., Food Chemistry, vol. 107, pp. 258-264 (2008).
Myers et al., Database Accession No. Q0TR23 pp. 1-2 (2006).
Passerat et al., Nutrition Research, vol. 15, No. 9, pp. 12871295 (1995).
D.R. Rao., Food Science and Technology International vol. 3, pp. 87-92 (1997).
Marta Rubio-Texeira., Biotechnology Advances, vol. 24, pp. 212-225 (2006).
Shimizu et al., Database Accession No. Q8XKX6 pp. 1-2 (2002).
Sudarsanam et al., Database Accession No. A5KPK7, pp. 1-2 (2007).
Tamm A et al., Management of Lactose Intolerance, pp. 55-63 (1994).
Anonymous, Asia Pacific Food Industry, Special Supplement, Ingredients & Additives, "Lactase: An Optimum Enzyme for Low Lactose Dairy Products", pp. 40-43 (Jun. 2001).
Anonymous, Food Ingredients, South America Innovation Awards (2017).
Anonymous, Food Ingredients Innovation Awards, "Novozymes is Finalist of the Fi Innovation Awards 2017 with Saphera" (2017).
Anonymous, Sequence Alignment between Amino Acid Sequences Disclosed in EP 2234501 and WO 01/ 90317 (date unknown).
Arla Foods Ingredients Group, brochure on "WheyPermeate Taste and Texture Enhancement at a Cost Benefit" (date unknown).

(Continued)

*Primary Examiner* — Tekchand Saidha
(74) *Attorney, Agent, or Firm* — Elias Lambiris

(57) ABSTRACT

The present invention relates to a method for producing a dairy product using an enzyme having lactase activity.

17 Claims, No Drawings

Specification includes a Sequence Listing.

(56) References Cited

OTHER PUBLICATIONS

Cruz et al., Revista de Microbiologia, vol. 30, pp. 265-271 (1999).
De Vrese et al., Am. J. Clin. Nutr., vol. 73(suppl.), pp. 421-429 (2001).
Goulas et al., Appl. Microbiol. Biotechnol., DOI 10.1007/s00253-007-1099-1 (2007).
Hussein et al., Journal of Food Protection, vol. 52, No. 1, pp. 30-34 (1988).
Mahoney et al., Journal of Food Science, vol. 43, pp. 584-591 (1978).
Moller et al., Applied and Environmental Microbiology, vol. 67, No. 5, pp. 2276-2283 (2001).

\* cited by examiner

SEQUENCE LISTING

<160> NUMBER OF SEQ IDS NOS: 7

<210> SEQ ID NO 1
<211> LENGTH: 1931
<212> TYPE: PRT
<213> ORGANISM: Bifidobacterium bifidum

<400> SEQUENCE: 1

Met Lys Lys Pro Leu Gly Lys Ile Val Ala Ser Thr Ala Leu Leu Ile
1               5                   10                  15

Ser Val Ala Phe Ser Ser Ser Ile Ala Ser Ala Ala Val Glu Asp Ala
                20                  25                  30

Thr Arg Ser Asp Ser Thr Thr Gln Met Ser Ser Thr Pro Glu Val Ala
            35                  40                  45

Tyr Ser Ser Ala Val Asp Ser Lys Gln Asn Arg Thr Ser Asp Phe Asp

```
            50                  55                  60
Ala Asn Trp Lys Phe Met Leu Ser Asp Ser Val Gln Ala Gln Asp Pro
 65                  70                  75                  80

Ala Phe Asp Asp Ser Ala Trp Gln Gln Val Asp Leu Pro His Asp Tyr
                 85                  90                  95

Ser Ile Thr Gln Lys Tyr Ser Gln Ser Asn Glu Ala Glu Ser Ala Tyr
                100                 105                 110

Leu Pro Gly Gly Thr Gly Trp Tyr Arg Lys Ser Phe Thr Ile Asp Arg
                115                 120                 125

Asp Leu Ala Gly Lys Arg Ile Ala Ile Asn Phe Asp Gly Val Tyr Met
            130                 135                 140

Asn Ala Thr Val Trp Phe Asn Gly Val Lys Leu Gly Thr His Pro Tyr
145                 150                 155                 160

Gly Tyr Ser Pro Phe Ser Phe Asp Leu Thr Gly Asn Ala Lys Phe Gly
                165                 170                 175

Gly Glu Asn Thr Ile Val Val Lys Val Glu Asn Arg Leu Pro Ser Ser
                180                 185                 190

Arg Trp Tyr Ser Gly Ser Gly Ile Tyr Arg Asp Val Thr Leu Thr Val
            195                 200                 205

Thr Asp Gly Val His Val Gly Asn Asn Gly Val Ala Ile Lys Thr Pro
210                 215                 220

Ser Leu Ala Thr Gln Asn Gly Gly Asp Val Thr Met Asn Leu Thr Thr
225                 230                 235                 240

Lys Val Ala Asn Asp Thr Glu Ala Ala Ala Asn Ile Thr Leu Lys Gln
                245                 250                 255

Thr Val Phe Pro Lys Gly Gly Lys Thr Asp Ala Ala Ile Gly Thr Val
                260                 265                 270

Thr Thr Ala Ser Lys Ser Ile Ala Ala Gly Ala Ser Ala Asp Val Thr
            275                 280                 285

Ser Thr Ile Thr Ala Ala Ser Pro Lys Leu Trp Ser Ile Lys Asn Pro
            290                 295                 300

Asn Leu Tyr Thr Val Arg Thr Glu Val Leu Asn Gly Gly Lys Val Leu
305                 310                 315                 320

Asp Thr Tyr Asp Thr Glu Tyr Gly Phe Arg Trp Thr Gly Phe Asp Ala
                325                 330                 335

Thr Ser Gly Phe Ser Leu Asn Gly Glu Lys Val Lys Leu Lys Gly Val
                340                 345                 350

Ser Met His His Asp Gln Gly Ser Leu Gly Ala Val Ala Asn Arg Arg
            355                 360                 365

Ala Ile Glu Arg Gln Val Glu Ile Leu Gln Lys Met Gly Val Asn Ser
370                 375                 380

Ile Arg Thr Thr His Asn Pro Ala Ala Lys Ala Leu Ile Asp Val Cys
385                 390                 395                 400

Asn Glu Lys Gly Val Leu Val Val Glu Glu Val Phe Asp Met Trp Asn
                405                 410                 415

Arg Ser Lys Asn Gly Asn Thr Glu Asp Tyr Gly Lys Trp Phe Gly Gln
                420                 425                 430

Ala Ile Ala Gly Asp Asn Ala Val Leu Gly Gly Asp Lys Asp Glu Thr
            435                 440                 445

Trp Ala Lys Phe Asp Leu Thr Ser Thr Ile Asn Arg Asp Arg Asn Ala
            450                 455                 460

Pro Ser Val Ile Met Trp Ser Leu Gly Asn Glu Met Met Glu Gly Ile
465                 470                 475                 480
```

-continued

```
Ser Gly Ser Val Ser Gly Phe Pro Ala Thr Ser Ala Lys Leu Val Ala
            485                 490                 495

Trp Thr Lys Ala Ala Asp Ser Thr Arg Pro Met Thr Tyr Gly Asp Asn
            500                 505                 510

Lys Ile Lys Ala Asn Trp Asn Glu Ser Asn Thr Met Gly Asp Asn Leu
            515                 520                 525

Thr Ala Asn Gly Gly Val Val Gly Thr Asn Tyr Ser Asp Gly Ala Asn
            530                 535                 540

Tyr Asp Lys Ile Arg Thr Thr His Pro Ser Trp Ala Ile Tyr Gly Ser
545                 550                 555                 560

Glu Thr Ala Ser Ala Ile Asn Ser Arg Gly Ile Tyr Asn Arg Thr Thr
                565                 570                 575

Gly Gly Ala Gln Ser Ser Asp Lys Gln Leu Thr Ser Tyr Asp Asn Ser
                580                 585                 590

Ala Val Gly Trp Gly Ala Val Ala Ser Ser Ala Trp Tyr Asp Val Val
                595                 600                 605

Gln Arg Asp Phe Val Ala Gly Thr Tyr Val Trp Thr Gly Phe Asp Tyr
                610                 615                 620

Leu Gly Glu Pro Thr Pro Trp Asn Gly Thr Gly Ser Gly Ala Val Gly
625                 630                 635                 640

Ser Trp Pro Ser Pro Lys Asn Ser Tyr Phe Gly Ile Val Asp Thr Ala
                645                 650                 655

Gly Phe Pro Lys Asp Thr Tyr Tyr Phe Tyr Gln Ser Gln Trp Asn Asp
                660                 665                 670

Asp Val His Thr Leu His Ile Leu Pro Ala Trp Asn Glu Asn Val Val
                675                 680                 685

Ala Lys Gly Ser Gly Asn Asn Val Pro Val Val Val Tyr Thr Asp Ala
                690                 695                 700

Ala Lys Val Lys Leu Tyr Phe Thr Pro Lys Gly Ser Thr Glu Lys Arg
705                 710                 715                 720

Leu Ile Gly Glu Lys Ser Phe Thr Lys Lys Thr Thr Ala Ala Gly Tyr
                725                 730                 735

Thr Tyr Gln Val Tyr Glu Gly Ser Asp Lys Asp Ser Thr Ala His Lys
                740                 745                 750

Asn Met Tyr Leu Thr Trp Asn Val Pro Trp Ala Glu Gly Thr Ile Ser
                755                 760                 765

Ala Glu Ala Tyr Asp Glu Asn Asn Arg Leu Ile Pro Glu Gly Ser Thr
                770                 775                 780

Glu Gly Asn Ala Ser Val Thr Thr Gly Lys Ala Ala Lys Leu Lys
785                 790                 795                 800

Ala Asp Ala Asp Arg Lys Thr Ile Thr Ala Asp Gly Lys Asp Leu Ser
                805                 810                 815

Tyr Ile Glu Val Asp Val Thr Asp Ala Asn Gly His Ile Val Pro Asp
                820                 825                 830

Ala Ala Asn Arg Val Thr Phe Asp Val Lys Gly Ala Gly Lys Leu Val
                835                 840                 845

Gly Val Asp Asn Gly Ser Ser Pro Asp His Asp Ser Tyr Gln Ala Asp
                850                 855                 860

Asn Arg Lys Ala Phe Ser Gly Lys Val Leu Ala Ile Val Gln Ser Thr
865                 870                 875                 880

Lys Glu Ala Gly Glu Ile Thr Val Thr Ala Lys Ala Asp Gly Leu Gln
                885                 890                 895
```

```
Ser Ser Thr Val Lys Ile Ala Thr Thr Ala Val Pro Gly Thr Ser Thr
            900                 905                 910

Glu Lys Thr Val Arg Ser Phe Tyr Tyr Ser Arg Asn Tyr Tyr Val Lys
            915                 920                 925

Thr Gly Asn Lys Pro Ile Leu Pro Ser Asp Val Glu Val Arg Tyr Ser
            930                 935                 940

Asp Gly Thr Ser Asp Arg Gln Asn Val Thr Trp Asp Ala Val Ser Asp
945                 950                 955                 960

Asp Gln Ile Ala Lys Ala Gly Ser Phe Ser Val Ala Gly Thr Val Ala
                965                 970                 975

Gly Gln Lys Ile Ser Val Arg Val Thr Met Ile Asp Glu Ile Gly Ala
            980                 985                 990

Leu Leu Asn Tyr Ser Ala Ser Thr Pro Val Gly Thr Pro Ala Val Leu
            995                 1000                1005

Pro Gly Ser Arg Pro Ala Val Leu Pro Asp Gly Thr Val Thr Ser
    1010                1015                1020

Ala Asn Phe Ala Val His Trp Thr Lys Pro Ala Asp Thr Val Tyr
    1025                1030                1035

Asn Thr Ala Gly Thr Val Lys Val Pro Gly Thr Ala Thr Val Phe
    1040                1045                1050

Gly Lys Glu Phe Lys Val Thr Ala Thr Ile Arg Val Gln Arg Ser
    1055                1060                1065

Gln Val Thr Ile Gly Ser Ser Val Ser Gly Asn Ala Leu Arg Leu
    1070                1075                1080

Thr Gln Asn Ile Pro Ala Asp Lys Gln Ser Asp Thr Leu Asp Ala
    1085                1090                1095

Ile Lys Asp Gly Ser Thr Thr Val Asp Ala Asn Thr Gly Gly Gly
    1100                1105                1110

Ala Asn Pro Ser Ala Trp Thr Asn Trp Ala Tyr Ser Lys Ala Gly
    1115                1120                1125

His Asn Thr Ala Glu Ile Thr Phe Glu Tyr Ala Thr Glu Gln Gln
    1130                1135                1140

Leu Gly Gln Ile Val Met Tyr Phe Phe Arg Asp Ser Asn Ala Val
    1145                1150                1155

Arg Phe Pro Asp Ala Gly Lys Thr Lys Ile Gln Ile Ser Ala Asp
    1160                1165                1170

Gly Lys Asn Trp Thr Asp Leu Ala Ala Thr Glu Thr Ile Ala Ala
    1175                1180                1185

Gln Glu Ser Ser Asp Arg Val Lys Pro Tyr Thr Tyr Asp Phe Ala
    1190                1195                1200

Pro Val Gly Ala Thr Phe Val Lys Val Thr Val Thr Asn Ala Asp
    1205                1210                1215

Thr Thr Thr Pro Ser Gly Val Val Cys Ala Gly Leu Thr Glu Ile
    1220                1225                1230

Glu Leu Lys Thr Ala Thr Ser Lys Phe Val Thr Asn Thr Ser Ala
    1235                1240                1245

Ala Leu Ser Ser Leu Thr Val Asn Gly Thr Lys Val Ser Asp Ser
    1250                1255                1260

Val Leu Ala Ala Gly Ser Tyr Asn Thr Pro Ala Ile Ile Ala Asp
    1265                1270                1275

Val Lys Ala Glu Gly Glu Gly Asn Ala Ser Val Thr Val Leu Pro
    1280                1285                1290

Ala His Asp Asn Val Ile Arg Val Ile Thr Glu Ser Glu Asp His
```

-continued

```
            1295                1300                1305
Val Thr Arg Lys Thr Phe Thr Ile Asn Leu Gly Thr Glu Gln Glu
            1310                1315                1320
Phe Pro Ala Asp Ser Asp Glu Arg Asp Tyr Pro Ala Ala Asp Met
            1325                1330                1335
Thr Val Thr Val Gly Ser Glu Gln Thr Ser Gly Thr Ala Thr Glu
            1340                1345                1350
Gly Pro Lys Lys Phe Ala Val Asp Gly Asn Thr Ser Thr Tyr Trp
            1355                1360                1365
His Ser Asn Trp Thr Pro Thr Val Asn Asp Leu Trp Ile Ala
            1370                1375                1380
Phe Glu Leu Gln Lys Pro Thr Lys Leu Asp Ala Leu Arg Tyr Leu
            1385                1390                1395
Pro Arg Pro Ala Gly Ser Lys Asn Gly Ser Val Thr Glu Tyr Lys
            1400                1405                1410
Val Gln Val Ser Asp Asp Gly Thr Asn Trp Thr Asp Ala Gly Ser
            1415                1420                1425
Gly Thr Trp Thr Thr Asp Tyr Gly Trp Lys Leu Ala Glu Phe Asn
            1430                1435                1440
Gln Pro Val Thr Thr Lys His Val Arg Leu Lys Ala Val His Thr
            1445                1450                1455
Tyr Ala Asp Ser Gly Asn Asp Lys Phe Met Ser Ala Ser Glu Ile
            1460                1465                1470
Arg Leu Arg Lys Ala Val Asp Thr Thr Asp Ile Ser Gly Ala Thr
            1475                1480                1485
Val Thr Val Pro Ala Lys Leu Thr Val Asp Arg Val Asp Ala Asp
            1490                1495                1500
His Pro Ala Thr Phe Ala Thr Lys Asp Val Thr Val Thr Leu Gly
            1505                1510                1515
Asp Ala Thr Leu Arg Tyr Gly Val Asp Tyr Leu Leu Asp Tyr Ala
            1520                1525                1530
Gly Asn Thr Ala Val Gly Lys Ala Thr Val Thr Val Arg Gly Ile
            1535                1540                1545
Asp Lys Tyr Ser Gly Thr Val Ala Lys Thr Phe Thr Ile Glu Leu
            1550                1555                1560
Lys Asn Ala Pro Ala Pro Glu Pro Thr Leu Thr Ser Val Ser Val
            1565                1570                1575
Lys Thr Lys Pro Ser Lys Leu Thr Tyr Val Val Gly Asp Ala Phe
            1580                1585                1590
Asp Pro Ala Gly Leu Val Leu Gln Leu Asn Tyr Asp Asp Ser
            1595                1600                1605
Thr Gly Thr Val Thr Trp Asn Thr Gln Thr Ala Gly Asp Phe Thr
            1610                1615                1620
Phe Lys Pro Ala Leu Asp Ala Lys Leu Lys Val Thr Asp Lys Thr
            1625                1630                1635
Val Thr Val Thr Tyr Gln Gly Lys Ser Ala Val Ile Asp Ile Thr
            1640                1645                1650
Val Ser Gln Pro Ala Pro Thr Val Ser Lys Thr Asp Leu Asp Lys
            1655                1660                1665
Ala Ile Lys Ala Ile Glu Ala Lys Asn Pro Asp Ser Ser Lys Tyr
            1670                1675                1680
Thr Ala Asp Ser Trp Lys Thr Phe Ala Asp Ala Met Ala His Ala
            1685                1690                1695
```

Lys Ala Val Ile Ala Asp Asp Ser Ala Thr Gln Gln Asp Val Asp
     1700                1705                1710

Asn Ala Leu Lys Ala Leu Thr Asp Ala Tyr Ala Gly Leu Thr Glu
     1715                1720                1725

Lys Thr Pro Glu Pro Ala Pro Val Ser Lys Ser Glu Leu Asp Lys
     1730                1735                1740

Lys Ile Lys Ala Ile Glu Glu Lys Leu Asp Gly Ser Lys Tyr
     1745                1750                1755

Thr Ala Glu Ser Trp Lys Ala Phe Glu Thr Ala Leu Ala His Ala
     1760                1765                1770

Lys Ala Val Ile Ala Ser Asp Ser Ala Thr Gln Gln Asn Val Asp
     1775                1780                1785

Ala Ala Leu Gly Ala Leu Thr Ser Ala Arg Asp Gly Leu Thr Glu
     1790                1795                1800

Lys Gly Glu Val Lys Pro Asp Pro Lys Pro Glu Pro Gly Thr Val
     1805                1810                1815

Asp Lys Ala Ala Leu Asp Lys Ala Val Lys Lys Val Glu Ala Glu
     1820                1825                1830

Lys Leu Asp Gly Ser Lys Tyr Thr Ala Asp Ser Trp Lys Ala Phe
     1835                1840                1845

Glu Thr Ala Leu Ala His Ala Lys Ala Val Ile Gly Asn Ala Asn
     1850                1855                1860

Ser Thr Gln Phe Asp Ile Asp Asn Ala Leu Ser Met Leu Asn Asp
     1865                1870                1875

Ala Arg Ala Ala Leu Lys Glu Lys Pro Gly Arg Ile Ile Ala Ile
     1880                1885                1890

Ile Asp Gly Ser Ala Leu Ser Lys Thr Gly Ala Ser Val Ala Ile
     1895                1900                1905

Ile Ala Ser Val Ala Ala Ala Met Leu Ala Val Gly Ala Gly Val
     1910                1915                1920

Met Ala Leu Arg Arg Lys Arg Ser
     1925                1930

<210> SEQ ID NO 2
<211> LENGTH: 1341
<212> TYPE: PRT
<213> ORGANISM: Bifidobacterium bifidum

<400> SEQUENCE: 2

Met Lys Lys Pro Leu Gly Lys Ile Val Ala Ser Thr Ala Leu Leu Ile
1               5                   10                  15

Ser Val Ala Phe Ser Ser Ser Ile Ala Ser Ala Ile Glu Asp Ala Thr
                20                  25                  30

Arg Ser Asp Ser Thr Thr Gln Met Ser Ser Thr Pro Glu Val Ala Tyr
         35                  40                  45

Ser Ser Ala Val Asp Ser Lys Gln Asn Arg Thr Ser Asp Phe Asp Ala
     50                  55                  60

Asn Trp Lys Phe Met Leu Ser Asp Ser Val Gln Ala Gln Asp Pro Ala
65                  70                  75                  80

Phe Asp Asp Ser Ala Trp Gln Gln Val Asp Leu Pro His Asp Tyr Ser
                85                  90                  95

Ile Thr Gln Lys Tyr Ser Gln Ser Asn Glu Ala Glu Ser Ala Tyr Leu
            100                 105                 110

Pro Gly Gly Thr Gly Trp Tyr Arg Lys Ser Phe Thr Ile Asp Arg Asp

```
            115                 120                 125
Leu Ala Gly Lys Arg Ile Ala Ile Asn Phe Asp Gly Val Tyr Met Asn
130                 135                 140
Ala Thr Val Trp Phe Asn Gly Val Lys Leu Gly Thr His Pro Tyr Gly
145                 150                 155                 160
Tyr Ser Pro Phe Ser Phe Asp Leu Thr Gly Asn Ala Lys Phe Gly Gly
                    165                 170                 175
Glu Asn Thr Ile Val Val Lys Val Glu Asn Arg Leu Pro Ser Ser Arg
                180                 185                 190
Trp Tyr Ser Gly Ser Gly Ile Tyr Arg Asp Val Thr Leu Thr Val Thr
            195                 200                 205
Asp Gly Val His Val Gly Asn Asn Gly Val Ala Ile Lys Thr Pro Ser
210                 215                 220
Leu Ala Thr Gln Asn Gly Gly Asp Val Thr Met Asn Leu Thr Thr Lys
225                 230                 235                 240
Val Ala Asn Asp Thr Glu Ala Ala Ala Asn Ile Thr Leu Lys Gln Thr
                245                 250                 255
Val Phe Pro Lys Gly Gly Lys Thr Asp Ala Ala Ile Gly Thr Val Thr
                260                 265                 270
Thr Ala Ser Lys Ser Ile Ala Ala Gly Ala Ser Ala Asp Val Thr Ser
            275                 280                 285
Thr Ile Thr Ala Ala Ser Pro Lys Leu Trp Ser Ile Lys Asn Pro Asn
290                 295                 300
Leu Tyr Thr Val Arg Thr Glu Val Leu Asn Gly Gly Lys Val Leu Asp
305                 310                 315                 320
Thr Tyr Asp Thr Glu Tyr Gly Phe Arg Trp Thr Gly Phe Asp Ala Thr
                325                 330                 335
Ser Gly Phe Ser Leu Asn Gly Glu Lys Val Lys Leu Lys Gly Val Ser
                340                 345                 350
Met His His Asp Gln Gly Ser Leu Gly Ala Val Ala Asn Arg Arg Ala
            355                 360                 365
Ile Glu Arg Gln Val Glu Ile Leu Gln Lys Met Gly Val Asn Ser Ile
370                 375                 380
Arg Thr Thr His Asn Pro Ala Ala Lys Ala Leu Ile Asp Val Cys Asn
385                 390                 395                 400
Glu Lys Gly Val Leu Val Val Glu Glu Val Phe Asp Met Trp Asn Arg
                405                 410                 415
Ser Lys Asn Gly Asn Thr Glu Asp Tyr Gly Lys Trp Phe Gly Gln Ala
                420                 425                 430
Ile Ala Gly Asp Asn Ala Val Leu Gly Gly Asp Lys Asp Glu Thr Trp
            435                 440                 445
Ala Lys Phe Asp Leu Thr Thr Ile Asn Arg Asp Arg Asn Ala Pro
450                 455                 460
Ser Val Ile Met Trp Ser Leu Gly Asn Glu Met Met Glu Gly Ile Ser
465                 470                 475                 480
Gly Ser Val Ser Gly Phe Ser Ala Thr Ser Ala Lys Leu Val Ala Trp
                485                 490                 495
Thr Lys Ala Ala Asp Ser Thr Arg Pro Met Thr Tyr Gly Asp Asn Lys
                500                 505                 510
Ile Lys Ala Asn Trp Asn Glu Ser Asn Thr Met Gly Asp Asn Leu Thr
            515                 520                 525
Ala Asn Gly Gly Val Val Gly Thr Asn Tyr Ser Asp Gly Ala Asn Tyr
530                 535                 540
```

-continued

```
Asp Lys Ile Arg Thr Thr His Pro Ser Trp Ala Ile Tyr Gly Ser Glu
545                 550                 555                 560

Thr Ala Ser Ala Ile Asn Ser Arg Gly Ile Tyr Asn Arg Thr Thr Gly
                565                 570                 575

Gly Ala Gln Ser Ser Asp Lys Gln Leu Thr Ser Tyr Asp Asn Ser Ala
            580                 585                 590

Val Gly Trp Gly Ala Val Ala Ser Ser Ala Trp Tyr Asp Val Val Gln
        595                 600                 605

Arg Asp Phe Val Ala Gly Thr Tyr Val Trp Thr Gly Phe Asp Tyr Leu
610                 615                 620

Gly Glu Pro Thr Pro Trp Asn Gly Thr Gly Ser Gly Ala Val Gly Ser
625                 630                 635                 640

Trp Pro Ser Pro Lys Asn Ser Tyr Phe Gly Ile Val Asp Thr Ala Gly
                645                 650                 655

Phe Pro Lys Asp Thr Tyr Tyr Phe Tyr Gln Ser Gln Trp Asn Asp Asp
            660                 665                 670

Val His Thr Leu His Ile Leu Pro Ala Trp Asn Glu Asn Val Val Ala
        675                 680                 685

Lys Gly Ser Gly Asn Asn Val Pro Val Val Val Tyr Thr Asp Ala Ala
690                 695                 700

Lys Val Lys Leu Tyr Phe Thr Pro Lys Gly Ser Thr Glu Gln Arg Leu
705                 710                 715                 720

Ile Gly Glu Lys Ser Phe Thr Lys Lys Thr Ala Ala Gly Tyr Thr
                725                 730                 735

Tyr Gln Val Tyr Glu Gly Ser Asp Lys Asp Ser Thr Ala His Lys Asn
            740                 745                 750

Met Tyr Leu Thr Trp Asn Val Pro Trp Ala Glu Gly Thr Ile Ser Ala
        755                 760                 765

Glu Ala Tyr Asp Glu Asn Asn Arg Leu Ile Pro Glu Gly Ser Thr Glu
770                 775                 780

Gly Asn Ala Ser Val Thr Thr Thr Gly Lys Ala Ala Lys Leu Lys Ala
785                 790                 795                 800

Asp Ala Asp Arg Lys Thr Ile Thr Ala Asp Gly Lys Asp Leu Ser Tyr
                805                 810                 815

Ile Glu Val Asp Val Thr Asp Ala Asn Gly His Ile Val Pro Asp Ala
            820                 825                 830

Ala Asn Arg Val Thr Phe Asp Val Lys Gly Ala Gly Lys Leu Val Gly
        835                 840                 845

Val Asp Asn Gly Ser Ser Pro Asp His Asp Ser Tyr Gln Ala Asp Asn
850                 855                 860

Arg Lys Ala Phe Ser Gly Lys Val Leu Ala Ile Val Gln Ser Thr Lys
865                 870                 875                 880

Glu Ala Gly Glu Ile Thr Val Thr Ala Lys Ala Asp Gly Leu Gln Ser
                885                 890                 895

Ser Thr Val Lys Ile Ala Thr Thr Ala Val Pro Gly Thr Ser Thr Glu
            900                 905                 910

Lys Thr Val Arg Ser Phe Tyr Tyr Ser Arg Asn Tyr Tyr Val Lys Thr
        915                 920                 925

Gly Asn Lys Pro Ile Leu Pro Ser Asp Val Glu Val Arg Tyr Ser Asp
930                 935                 940

Gly Thr Ser Asp Arg Gln Asn Val Thr Trp Asp Ala Val Ser Asp Asp
945                 950                 955                 960
```

-continued

Gln Ile Ala Lys Ala Gly Ser Phe Ser Val Ala Gly Thr Val Ala Gly
                965                 970                 975

Gln Lys Ile Ser Val Arg Val Thr Met Ile Asp Glu Ile Gly Ala Leu
            980                 985                 990

Leu Asn Tyr Ser Ala Ser Thr Pro Val Gly Thr Pro Ala Val Leu Pro
        995                1000               1005

Gly Ser Arg Pro Ala Val Leu Pro Asp Gly Thr Val Thr Ser Ala
    1010                1015               1020

Asn Phe Ala Val His Trp Thr Lys Pro Ala Asp Thr Val Tyr Asn
    1025                1030               1035

Thr Ala Gly Thr Val Lys Val Pro Gly Thr Ala Thr Val Phe Gly
    1040                1045               1050

Lys Glu Phe Lys Val Thr Ala Thr Ile Arg Val Gln Arg Ser Gln
    1055                1060               1065

Val Thr Ile Gly Ser Ser Val Ser Gly Asn Ala Leu Arg Leu Thr
    1070                1075               1080

Gln Asn Ile Pro Ala Asp Lys Gln Ser Asp Thr Leu Asp Ala Ile
    1085                1090               1095

Lys Asp Gly Ser Thr Thr Val Asp Ala Asn Thr Gly Gly Gly Ala
    1100                1105               1110

Asn Pro Ser Ala Trp Thr Asn Trp Ala Tyr Ser Lys Ala Gly His
    1115                1120               1125

Asn Thr Ala Glu Ile Thr Phe Glu Tyr Ala Thr Glu Gln Gln Leu
    1130                1135               1140

Gly Gln Ile Val Met Tyr Phe Phe Arg Asp Ser Asn Ala Val Arg
    1145                1150               1155

Phe Pro Asp Ala Gly Lys Thr Lys Ile Gln Ile Ser Ala Asp Gly
    1160                1165               1170

Lys Asn Trp Thr Asp Leu Ala Ala Thr Glu Thr Ile Ala Ala Gln
    1175                1180               1185

Glu Ser Ser Asp Arg Val Lys Pro Tyr Thr Tyr Asp Phe Ala Pro
    1190                1195               1200

Val Gly Ala Thr Phe Val Arg Val Thr Val Thr Asn Ala Asp Thr
    1205                1210               1215

Thr Thr Pro Ser Gly Val Val Cys Ala Gly Leu Thr Glu Ile Glu
    1220                1225               1230

Leu Lys Thr Ala Thr Ser Lys Phe Val Ala Asn Thr Ser Ala Ala
    1235                1240               1245

Leu Ser Ser Leu Thr Val Asn Gly Thr Lys Val Ser Asp Ser Val
    1250                1255               1260

Leu Ala Ala Gly Ser Tyr Asn Thr Pro Ala Ile Ile Ala Asp Val
    1265                1270               1275

Lys Ala Glu Gly Glu Gly Asn Ala Ser Val Thr Val Leu Pro Ala
    1280                1285               1290

His Asp Asn Val Ile Arg Val Ile Thr Glu Ser Glu Asp His Val
    1295                1300               1305

Thr Arg Lys Thr Phe Thr Ile Asn Leu Gly Thr Glu Gln Glu Phe
    1310                1315               1320

Pro Ala Asp Ser Asp Glu Arg Asp Gln His Gln His Gln His Gln
    1325                1330               1335

His Gln Gln
    1340

```
<210> SEQ ID NO 3
<211> LENGTH: 1752
<212> TYPE: PRT
<213> ORGANISM: Bifidobacterium bifidum

<400> SEQUENCE: 3

Met Ala Val Arg Arg Leu Gly Gly Arg Ile Val Ala Phe Ala Ala Thr
1               5                   10                  15

Val Ala Leu Ser Ile Pro Leu Gly Leu Leu Thr Asn Ser Ala Trp Ala
            20                  25                  30

Val Glu Asp Ala Thr Arg Ser Asp Ser Thr Thr Gln Met Ser Ser Thr
        35                  40                  45

Pro Glu Val Val Tyr Ser Ser Ala Val Asp Ser Lys Gln Asn Arg Thr
    50                  55                  60

Ser Asp Phe Asp Ala Asn Trp Lys Phe Met Leu Ser Asp Ser Val Gln
65                  70                  75                  80

Ala Gln Asp Pro Ala Phe Asp Asp Ser Ala Trp Gln Gln Val Asp Leu
                85                  90                  95

Pro His Asp Tyr Ser Ile Thr Gln Lys Tyr Ser Gln Ser Asn Glu Ala
            100                 105                 110

Glu Ser Ala Tyr Leu Pro Gly Gly Thr Gly Trp Tyr Arg Lys Ser Phe
        115                 120                 125

Thr Ile Asp Arg Asp Leu Ala Gly Lys Arg Ile Ala Ile Asn Phe Asp
130                 135                 140

Gly Val Tyr Met Asn Ala Thr Val Trp Phe Asn Gly Val Lys Leu Gly
145                 150                 155                 160

Thr His Pro Tyr Gly Tyr Ser Pro Phe Ser Phe Asp Leu Thr Gly Asn
                165                 170                 175

Ala Lys Phe Gly Gly Glu Asn Thr Ile Val Val Lys Val Glu Asn Arg
            180                 185                 190

Leu Pro Ser Ser Arg Trp Tyr Ser Gly Ser Gly Ile Tyr Arg Asp Val
        195                 200                 205

Thr Leu Thr Val Thr Asp Gly Val His Val Gly Asn Asn Gly Val Ala
210                 215                 220

Ile Lys Thr Pro Ser Leu Ala Thr Gln Asn Gly Gly Asp Val Thr Met
225                 230                 235                 240

Asn Leu Thr Thr Lys Val Ala Asn Asp Thr Glu Ala Ala Ala Asn Ile
                245                 250                 255

Thr Leu Lys Gln Thr Val Phe Pro Lys Gly Gly Lys Thr Asp Ala Ala
            260                 265                 270

Ile Gly Thr Val Thr Thr Ala Ser Lys Ser Ile Ala Ala Gly Ala Ser
        275                 280                 285

Ala Asp Val Thr Ser Thr Ile Thr Ala Ala Ser Pro Lys Leu Trp Ser
    290                 295                 300

Ile Lys Asn Pro Asn Leu Tyr Thr Val Arg Thr Glu Val Leu Asn Gly
305                 310                 315                 320

Gly Lys Val Leu Asp Thr Tyr Asp Thr Glu Tyr Gly Phe Arg Trp Thr
                325                 330                 335

Gly Phe Asp Ala Thr Ser Gly Phe Ser Leu Asn Gly Glu Lys Val Lys
            340                 345                 350

Leu Lys Gly Val Ser Met His His Asp Gln Gly Ser Leu Gly Ala Val
        355                 360                 365

Ala Asn Arg Arg Ala Ile Glu Arg Gln Val Glu Ile Leu Gln Lys Met
    370                 375                 380
```

```
Gly Val Asn Ser Ile Arg Thr Thr His Asn Pro Ala Ala Lys Ala Leu
385                 390                 395                 400

Ile Asp Val Cys Asn Glu Lys Gly Val Leu Val Val Glu Glu Val Phe
            405                 410                 415

Asp Met Trp Asn Arg Ser Lys Asn Gly Asn Thr Glu Asp Tyr Gly Lys
        420                 425                 430

Trp Phe Gly Gln Ala Ile Ala Gly Asp Asn Ala Val Leu Gly Gly Asp
    435                 440                 445

Lys Asp Glu Thr Trp Ala Lys Phe Asp Leu Thr Ser Thr Ile Asn Arg
450                 455                 460

Asp Arg Asn Ala Pro Ser Val Ile Met Trp Ser Leu Gly Asn Glu Met
465                 470                 475                 480

Met Glu Gly Ile Ser Gly Ser Val Ser Gly Phe Pro Ala Thr Ser Ala
            485                 490                 495

Lys Leu Val Ala Trp Thr Lys Ala Ala Asp Ser Thr Arg Pro Met Thr
        500                 505                 510

Tyr Gly Asp Asn Lys Ile Lys Ala Asn Trp Asn Glu Ser Asn Thr Met
    515                 520                 525

Gly Asp Asn Leu Thr Ala Asn Gly Gly Val Val Gly Thr Asn Tyr Ser
530                 535                 540

Asp Gly Ala Asn Tyr Asp Lys Ile Arg Thr Thr His Pro Ser Trp Ala
545                 550                 555                 560

Ile Tyr Gly Ser Glu Thr Ala Ser Ala Ile Asn Ser Arg Gly Ile Tyr
            565                 570                 575

Asn Arg Thr Thr Gly Gly Ala Gln Ser Ser Asp Lys Gln Leu Thr Ser
        580                 585                 590

Tyr Asp Asn Ser Ala Val Gly Trp Gly Ala Val Ala Ser Ser Ala Trp
    595                 600                 605

Tyr Asp Val Val Gln Arg Asp Phe Val Ala Gly Thr Tyr Val Trp Thr
610                 615                 620

Gly Phe Asp Tyr Leu Gly Glu Pro Thr Pro Trp Asn Gly Thr Gly Ser
625                 630                 635                 640

Gly Ala Val Gly Ser Trp Pro Ser Pro Lys Asn Ser Tyr Phe Gly Ile
            645                 650                 655

Val Asp Thr Ala Gly Phe Pro Lys Asp Thr Tyr Tyr Phe Tyr Gln Ser
        660                 665                 670

Gln Trp Asn Asp Asp Val His Thr Leu His Ile Leu Pro Ala Trp Asn
    675                 680                 685

Glu Asn Val Val Ala Lys Gly Ser Gly Asn Asn Val Pro Val Val Val
690                 695                 700

Tyr Thr Asp Ala Ala Lys Val Lys Leu Tyr Phe Thr Pro Lys Gly Ser
705                 710                 715                 720

Thr Glu Lys Arg Leu Ile Gly Glu Lys Ser Phe Thr Lys Lys Thr Thr
            725                 730                 735

Ala Ala Gly Tyr Thr Tyr Gln Val Tyr Glu Gly Ser Asp Lys Asp Ser
        740                 745                 750

Thr Ala His Lys Asn Met Tyr Leu Thr Trp Asn Val Pro Trp Ala Glu
    755                 760                 765

Gly Thr Ile Ser Ala Glu Ala Tyr Asp Glu Asn Asn Arg Leu Ile Pro
770                 775                 780

Glu Gly Ser Thr Glu Gly Asn Ala Ser Val Thr Thr Gly Lys Ala
785                 790                 795                 800

Ala Lys Leu Lys Ala Asp Ala Asp Arg Lys Thr Ile Thr Ala Asp Gly
```

```
                805                 810                 815
Lys Asp Leu Ser Tyr Ile Glu Val Asp Val Thr Asp Ala Asn Gly His
            820                 825                 830

Ile Val Pro Asp Ala Ala Asn Arg Val Thr Phe Asp Val Lys Gly Ala
            835                 840                 845

Gly Lys Leu Val Gly Val Asp Asn Gly Ser Ser Pro Asp His Asp Ser
            850                 855                 860

Tyr Gln Ala Asp Asn Arg Lys Ala Phe Ser Gly Lys Val Leu Ala Ile
865                 870                 875                 880

Val Gln Ser Thr Lys Glu Ala Gly Glu Ile Thr Val Thr Ala Lys Ala
                885                 890                 895

Asp Gly Leu Gln Ser Ser Thr Val Lys Ile Ala Thr Thr Ala Val Pro
            900                 905                 910

Gly Thr Ser Thr Glu Lys Thr Val Arg Ser Phe Tyr Tyr Ser Arg Asn
            915                 920                 925

Tyr Tyr Val Lys Thr Gly Asn Lys Pro Ile Leu Pro Ser Asp Val Glu
            930                 935                 940

Val Arg Tyr Ser Asp Gly Thr Ser Asp Arg Gln Asn Val Thr Trp Asp
945                 950                 955                 960

Ala Val Ser Asp Asp Gln Ile Ala Lys Ala Gly Ser Phe Ser Val Ala
                965                 970                 975

Gly Thr Val Ala Gly Gln Lys Ile Ser Val Arg Val Thr Met Ile Asp
            980                 985                 990

Glu Ile Gly Ala Leu Leu Asn Tyr Ser Ala Ser Thr Pro Val Gly Thr
            995                 1000                1005

Pro Ala Val Leu Pro Gly Ser Arg Pro Ala Val Leu Pro Asp Gly
            1010                1015                1020

Thr Val Thr Ser Ala Asn Phe Ala Val His Trp Thr Lys Pro Ala
            1025                1030                1035

Asp Thr Val Tyr Asn Thr Ala Gly Thr Val Lys Val Pro Gly Thr
            1040                1045                1050

Ala Thr Val Phe Gly Lys Glu Phe Lys Val Thr Ala Thr Ile Arg
            1055                1060                1065

Val Gln Arg Ser Gln Val Thr Ile Gly Ser Ser Val Ser Gly Asn
            1070                1075                1080

Ala Leu Arg Leu Thr Gln Asn Ile Pro Ala Asp Lys Gln Ser Asp
            1085                1090                1095

Thr Leu Asp Ala Ile Lys Asp Gly Ser Thr Thr Val Asp Ala Asn
            1100                1105                1110

Thr Gly Gly Gly Ala Asn Pro Ser Ala Trp Thr Asn Trp Ala Tyr
            1115                1120                1125

Ser Lys Ala Gly His Asn Thr Ala Glu Ile Thr Phe Glu Tyr Ala
            1130                1135                1140

Thr Glu Gln Gln Leu Gly Gln Ile Val Met Tyr Phe Phe Arg Asp
            1145                1150                1155

Ser Asn Ala Val Arg Phe Pro Asp Ala Gly Lys Thr Lys Ile Gln
            1160                1165                1170

Ile Ser Ala Asp Gly Lys Asn Trp Thr Asp Leu Ala Ala Thr Glu
            1175                1180                1185

Thr Ile Ala Ala Gln Glu Ser Ser Asp Arg Val Lys Pro Tyr Thr
            1190                1195                1200

Tyr Asp Phe Ala Pro Val Gly Ala Thr Phe Val Lys Val Thr Val
            1205                1210                1215
```

-continued

```
Thr Asn Ala Asp Thr Thr Pro Ser Gly Val Val Cys Ala Gly
1220            1225            1230

Leu Thr Glu Ile Glu Leu Lys Thr Ala Thr Ser Lys Phe Val Thr
1235            1240            1245

Asn Thr Ser Ala Ala Leu Ser Ser Leu Thr Val Asn Gly Thr Lys
1250            1255            1260

Val Ser Asp Ser Val Leu Ala Ala Gly Ser Tyr Asn Thr Pro Ala
1265            1270            1275

Ile Ile Ala Asp Val Lys Ala Glu Gly Glu Gly Asn Ala Ser Val
1280            1285            1290

Thr Val Leu Pro Ala His Asp Asn Val Ile Arg Val Ile Thr Glu
1295            1300            1305

Ser Glu Asp His Val Thr Arg Lys Thr Phe Thr Ile Asn Leu Gly
1310            1315            1320

Thr Glu Gln Glu Phe Pro Ala Asp Ser Asp Glu Arg Asp Tyr Pro
1325            1330            1335

Ala Ala Asp Met Thr Val Thr Val Gly Ser Glu Gln Thr Ser Gly
1340            1345            1350

Thr Ala Thr Glu Gly Pro Lys Lys Phe Ala Val Asp Gly Asn Thr
1355            1360            1365

Ser Thr Tyr Trp His Ser Asn Trp Thr Pro Thr Val Asn Asp
1370            1375            1380

Leu Trp Ile Ala Phe Glu Leu Gln Lys Pro Thr Lys Leu Asp Ala
1385            1390            1395

Leu Arg Tyr Leu Pro Arg Pro Ala Gly Ser Lys Asn Gly Ser Val
1400            1405            1410

Thr Glu Tyr Lys Val Gln Val Ser Asp Asp Gly Thr Asn Trp Thr
1415            1420            1425

Asp Ala Gly Ser Gly Thr Trp Thr Thr Asp Tyr Gly Trp Lys Leu
1430            1435            1440

Ala Glu Phe Asn Gln Pro Val Thr Thr Lys His Val Arg Leu Lys
1445            1450            1455

Ala Val His Thr Tyr Ala Asp Ser Gly Asn Asp Lys Phe Met Ser
1460            1465            1470

Ala Ser Glu Ile Arg Leu Arg Lys Ala Val Asp Thr Thr Asp Ile
1475            1480            1485

Ser Gly Ala Thr Val Thr Val Pro Ala Lys Leu Thr Val Asp Arg
1490            1495            1500

Val Asp Ala Asp His Pro Ala Thr Phe Ala Thr Lys Asp Val Thr
1505            1510            1515

Val Thr Leu Gly Asp Ala Thr Leu Arg Tyr Gly Val Asp Tyr Leu
1520            1525            1530

Leu Asp Tyr Ala Gly Asn Thr Ala Val Gly Lys Ala Thr Val Thr
1535            1540            1545

Val Arg Gly Ile Asp Lys Tyr Ser Gly Thr Val Ala Lys Thr Phe
1550            1555            1560

Thr Ile Glu Leu Lys Asn Ala Pro Ala Pro Glu Pro Thr Leu Thr
1565            1570            1575

Ser Val Ser Val Lys Thr Lys Pro Ser Lys Leu Thr Tyr Val Val
1580            1585            1590

Gly Asp Ala Phe Asp Pro Ala Gly Leu Val Leu Gln His Asp Arg
1595            1600            1605
```

```
Gln Ala Asp Arg Pro Pro Gln Pro Leu Val Gly Glu Gln Ala Asp
1610            1615                1620

Glu Arg Gly Leu Thr Cys Gly Thr Arg Cys Asp Arg Val Glu Gln
    1625            1630                1635

Leu Arg Lys His Glu Asn Arg Glu Ala His Arg Thr Gly Leu Asp
1640            1645                1650

His Leu Glu Phe Val Gly Ala Ala Asp Gly Ala Val Gly Glu Gln
    1655            1660                1665

Ala Thr Phe Lys Val His Val His Ala Asp Gln Gly Asp Gly Arg
1670            1675                1680

His Asp Asp Ala Asp Glu Arg Asp Ile Asp Pro His Val Pro Val
    1685            1690                1695

Asp His Ala Val Gly Glu Leu Ala Arg Ala Ala Cys His His Val
1700            1705                1710

Ile Gly Leu Arg Val Asp Thr His Arg Leu Lys Ala Ser Gly Phe
    1715            1720                1725

Gln Ile Pro Ala Asp Asp Met Ala Glu Ile Asp Arg Ile Thr Gly
1730            1735                1740

Phe His Arg Phe Glu Arg His Val Gly
    1745            1750

<210> SEQ ID NO 4
<211> LENGTH: 1935
<212> TYPE: PRT
<213> ORGANISM: Bifidobacterium bifidum

<400> SEQUENCE: 4

Met Ala Val Arg Arg Leu Gly Gly Arg Ile Val Ala Phe Ala Ala Thr
1               5                   10                  15

Val Ala Leu Ser Ile Pro Leu Gly Leu Leu Thr Asn Ser Ala Trp Ala
            20                  25                  30

Val Glu Asp Ala Thr Arg Ser Asp Ser Thr Thr Gln Met Ser Ser Thr
        35                  40                  45

Pro Glu Val Val Tyr Ser Ser Ala Val Asp Ser Lys Gln Asn Arg Thr
    50                  55                  60

Ser Asp Phe Asp Ala Asn Trp Lys Phe Met Leu Ser Asp Ser Val Gln
65                  70                  75                  80

Ala Gln Asp Pro Ala Phe Asp Ser Ala Trp Gln Gln Val Asp Leu
            85                  90                  95

Pro His Asp Tyr Ser Ile Thr Gln Lys Tyr Ser Gln Ser Asn Glu Ala
            100                 105                 110

Glu Ser Ala Tyr Leu Pro Gly Gly Thr Gly Trp Tyr Arg Lys Ser Phe
        115                 120                 125

Thr Ile Asp Arg Asp Leu Ala Gly Lys Arg Ile Ala Ile Asn Phe Asp
    130                 135                 140

Gly Val Tyr Met Asn Ala Thr Val Trp Phe Asn Gly Val Lys Leu Gly
145                 150                 155                 160

Thr His Pro Tyr Gly Tyr Ser Pro Phe Ser Phe Asp Leu Thr Gly Asn
            165                 170                 175

Ala Lys Phe Gly Gly Glu Asn Thr Ile Val Val Lys Val Glu Asn Arg
        180                 185                 190

Leu Pro Ser Ser Arg Trp Tyr Ser Gly Ser Gly Ile Tyr Arg Asp Val
    195                 200                 205

Thr Leu Thr Val Thr Asp Gly Val His Val Gly Asn Asn Gly Val Ala
    210                 215                 220
```

```
Ile Lys Thr Pro Ser Leu Ala Thr Gln Asn Gly Gly Asn Val Thr Met
225                 230                 235                 240

Asn Leu Thr Thr Lys Val Ala Asn Asp Thr Lys Ala Ala Ala Asn Ile
            245                 250                 255

Thr Leu Lys Gln Thr Val Phe Pro Lys Gly Lys Thr Asp Ala Ala
        260                 265                 270

Ile Gly Thr Val Thr Thr Ala Ser Lys Ser Ile Ala Ala Gly Ala Ser
            275                 280                 285

Ala Asp Val Thr Ser Thr Ile Thr Ala Ala Ser Pro Lys Leu Trp Ser
290                 295                 300

Ile Lys Asn Pro Asn Leu Tyr Thr Val Arg Thr Glu Val Leu Asn Gly
305                 310                 315                 320

Gly Lys Val Leu Asp Thr Tyr Asp Thr Glu Tyr Gly Phe Arg Trp Thr
                325                 330                 335

Gly Phe Asp Ala Thr Ser Gly Phe Ser Leu Asn Gly Glu Lys Val Lys
            340                 345                 350

Leu Lys Gly Val Ser Met His His Asp Gln Gly Ser Leu Gly Ala Val
        355                 360                 365

Ala Asn Arg Arg Ala Ile Glu Arg Gln Val Glu Ile Leu Gln Lys Met
370                 375                 380

Gly Val Asn Ser Ile Arg Thr Thr His Asn Pro Ala Ala Lys Ala Leu
385                 390                 395                 400

Ile Asp Val Cys Asn Glu Lys Gly Val Leu Val Glu Glu Val Phe
                405                 410                 415

Asp Met Trp Asn Arg Ser Lys Asn Gly Asn Thr Glu Asp Tyr Gly Lys
            420                 425                 430

Trp Phe Gly Gln Ala Ile Ala Gly Asp Asn Ala Val Leu Gly Gly Asp
        435                 440                 445

Lys Asp Glu Thr Trp Ala Lys Phe Asp Leu Thr Ser Thr Ile Asn Arg
    450                 455                 460

Asp Arg Asn Ala Pro Ser Val Ile Met Trp Ser Leu Gly Asn Glu Met
465                 470                 475                 480

Met Glu Gly Ile Ser Gly Ser Val Ser Gly Phe Pro Ala Thr Ser Ala
            485                 490                 495

Lys Leu Val Ala Trp Thr Lys Ala Ala Asp Ser Thr Arg Pro Met Thr
        500                 505                 510

Tyr Gly Asp Asn Lys Ile Lys Ala Asn Trp Asn Glu Ser Asn Thr Met
    515                 520                 525

Gly Asp Asn Leu Thr Ala Asn Gly Gly Val Val Gly Thr Asn Tyr Ser
530                 535                 540

Asp Gly Ala Asn Tyr Asp Lys Ile Arg Thr Thr His Pro Ser Trp Ala
545                 550                 555                 560

Ile Tyr Gly Ser Glu Thr Ala Ser Ala Ile Asn Ser Arg Gly Ile Tyr
            565                 570                 575

Asn Arg Thr Thr Gly Gly Ala Gln Ser Ser Asp Lys Gln Leu Thr Ser
        580                 585                 590

Tyr Asp Asn Ser Ala Val Gly Trp Gly Ala Val Ala Ser Ser Ala Trp
    595                 600                 605

Tyr Asp Val Val Gln Arg Asp Phe Val Ala Gly Thr Tyr Val Trp Thr
610                 615                 620

Gly Phe Asp Tyr Leu Gly Glu Pro Thr Pro Trp Asn Gly Thr Gly Ser
625                 630                 635                 640
```

```
Gly Ala Val Gly Ser Trp Pro Ser Pro Lys Asn Ser Tyr Phe Gly Ile
            645                 650                 655

Val Asp Thr Ala Gly Phe Pro Lys Asp Thr Tyr Tyr Phe Tyr Gln Ser
            660                 665                 670

Gln Trp Asn Asp Asp Val His Thr Leu His Ile Leu Pro Ala Trp Asn
            675                 680                 685

Glu Asn Val Val Ala Lys Gly Ser Gly Asn Asn Val Pro Val Val Val
            690                 695                 700

Tyr Thr Asp Ala Ala Lys Val Lys Leu Tyr Phe Thr Pro Lys Gly Ser
705                 710                 715                 720

Thr Glu Lys Arg Leu Ile Gly Glu Lys Ser Phe Thr Lys Thr Thr
            725                 730                 735

Ala Ala Gly Tyr Thr Tyr Gln Val Tyr Glu Gly Ala Asp Lys Asp Ser
            740                 745                 750

Thr Ala His Lys Asn Met Tyr Leu Thr Trp Asn Val Pro Trp Ala Glu
            755                 760                 765

Gly Thr Ile Ser Ala Glu Ala Tyr Asp Glu Asn Asn Arg Leu Ile Pro
            770                 775                 780

Glu Gly Ser Thr Glu Gly Asn Ala Ser Val Thr Thr Thr Gly Lys Ala
785                 790                 795                 800

Ala Lys Leu Lys Ala Asp Ala Asp Arg Lys Thr Ile Thr Ala Asp Gly
            805                 810                 815

Lys Asp Leu Ser Tyr Ile Glu Val Asp Val Thr Asp Ala Asn Gly His
            820                 825                 830

Ile Val Pro Asp Ala Ala Asn Arg Val Thr Phe Asp Val Lys Gly Ala
            835                 840                 845

Gly Lys Leu Val Gly Val Asp Asn Gly Ser Ser Pro Asp His Asp Ser
850                 855                 860

Tyr Gln Ala Asp Asn Arg Lys Ala Phe Ser Gly Lys Val Leu Ala Ile
865                 870                 875                 880

Val Gln Ser Thr Lys Glu Ala Gly Glu Ile Thr Val Thr Ala Lys Ala
            885                 890                 895

Asp Gly Leu Gln Ser Ser Thr Val Lys Ile Ala Thr Thr Ala Val Pro
            900                 905                 910

Gly Thr Ser Thr Glu Lys Thr Val Arg Ser Phe Tyr Tyr Ser Arg Asn
            915                 920                 925

Tyr Tyr Val Lys Thr Gly Asn Lys Pro Ile Leu Pro Ser Asp Val Glu
            930                 935                 940

Val Arg Tyr Ser Asp Gly Thr Ser Asp Arg Gln Asn Val Thr Trp Asp
945                 950                 955                 960

Ala Val Ser Asp Asp Gln Ile Ala Lys Ala Gly Ser Phe Ser Val Ala
            965                 970                 975

Gly Thr Val Ala Gly Gln Lys Ile Ser Val Arg Val Thr Met Ile Asp
            980                 985                 990

Glu Ile Gly Ala Leu Leu Asn Tyr Ser Ala Ser Thr Pro Val Gly Thr
            995                1000                1005

Pro Ala Val Leu Pro Gly Ser Arg Pro Ala Val Leu Pro Asp Gly
            1010                1015                1020

Thr Val Thr Ser Ala Asn Phe Ala Val Asp Trp Thr Lys Pro Ala
            1025                1030                1035

Asp Thr Val Tyr Asn Thr Ala Gly Thr Val Lys Val Pro Gly Thr
            1040                1045                1050

Ala Thr Val Phe Gly Lys Glu Phe Lys Val Thr Ala Thr Ile Arg
```

```
            1055                1060                1065
Val Gln Arg Ser Gln Val Thr Ile Gly Ser Ser Val Ser Gly Asn
            1070                1075                1080
Ala Leu Arg Leu Thr Gln Asn Ile Pro Ala Asp Lys Gln Ser Asp
            1085                1090                1095
Thr Leu Asp Ala Ile Lys Asp Gly Ser Thr Val Asp Ala Asn
            1100                1105                1110
Thr Gly Gly Gly Ala Asn Pro Ser Ala Trp Thr Asn Trp Ala Tyr
            1115                1120                1125
Ser Lys Ala Gly His Asn Thr Ala Glu Ile Thr Phe Glu Tyr Ala
            1130                1135                1140
Thr Glu Gln Gln Leu Gly Gln Ile Val Met Tyr Phe Phe Arg Asp
            1145                1150                1155
Ser Asn Ala Val Arg Phe Pro Asp Ala Gly Lys Thr Lys Ile Gln
            1160                1165                1170
Ile Ser Ala Asp Gly Lys Asn Trp Thr Asp Leu Ala Ala Thr Glu
            1175                1180                1185
Thr Ile Ala Ala Gln Glu Ser Ser Asp Arg Val Lys Pro Tyr Thr
            1190                1195                1200
Tyr Asp Phe Ala Pro Val Gly Ala Thr Phe Val Lys Val Thr Val
            1205                1210                1215
Thr Asn Ala Asp Thr Thr Thr Pro Ser Gly Val Val Cys Ala Gly
            1220                1225                1230
Leu Thr Glu Ile Glu Leu Lys Thr Ala Thr Ser Lys Phe Val Thr
            1235                1240                1245
Asn Thr Ser Ala Ala Leu Ser Ser Leu Thr Val Asn Gly Thr Lys
            1250                1255                1260
Val Ser Asp Ser Val Leu Ala Ala Gly Ser Tyr Asn Thr Pro Ala
            1265                1270                1275
Ile Ile Ala Asp Val Lys Ala Glu Gly Glu Gly Asn Ala Ser Val
            1280                1285                1290
Thr Val Leu Pro Ala His Asp Asn Val Ile Arg Val Ile Thr Glu
            1295                1300                1305
Ser Glu Asp His Val Thr Arg Lys Thr Phe Thr Ile Asn Leu Gly
            1310                1315                1320
Thr Glu Gln Glu Phe Pro Ala Asp Ser Asp Glu Arg Asp Tyr Pro
            1325                1330                1335
Ala Ala Asp Met Thr Val Thr Ala Gly Ser Glu Gln Thr Ser Gly
            1340                1345                1350
Thr Ala Thr Glu Gly Pro Lys Lys Phe Ala Val Asp Gly Asn Thr
            1355                1360                1365
Ser Thr Tyr Trp His Ser Asn Trp Thr Pro Thr Thr Val Asn Asp
            1370                1375                1380
Leu Trp Ile Ala Phe Glu Leu Gln Lys Pro Thr Lys Leu Asp Ala
            1385                1390                1395
Leu Arg Tyr Leu Pro Arg Pro Ala Gly Ser Lys Asn Gly Ser Val
            1400                1405                1410
Thr Glu Tyr Lys Val Gln Val Ser Asp Asp Gly Thr Asn Trp Thr
            1415                1420                1425
Asp Ala Gly Ser Gly Thr Trp Thr Thr Asp Tyr Gly Trp Lys Leu
            1430                1435                1440
Ala Glu Phe Asn Gln Pro Val Thr Thr Lys His Val Arg Leu Lys
            1445                1450                1455
```

```
Ala Val His Thr Tyr Ala Asp Ser Gly Asn Asp Lys Phe Met Ser
1460                1465                1470

Ala Ser Glu Ile Arg Leu Arg Lys Ala Val Asp Thr Thr Asp Ile
1475                1480                1485

Ser Gly Ala Thr Val Thr Val Pro Ala Lys Leu Thr Val Asp Arg
1490                1495                1500

Val Asp Ala Asp His Pro Ala Thr Phe Ala Thr Lys Asp Val Thr
1505                1510                1515

Val Thr Leu Gly Asp Ala Thr Leu Arg Tyr Gly Val Asp Tyr Leu
1520                1525                1530

Leu Asp Tyr Ala Gly Asn Thr Ala Val Gly Lys Ala Thr Val Thr
1535                1540                1545

Val Arg Gly Ile Asp Lys Tyr Ser Gly Thr Val Ala Lys Thr Phe
1550                1555                1560

Thr Ile Glu Leu Lys Asn Ala Pro Ala Pro Glu Pro Thr Leu Thr
1565                1570                1575

Ser Val Ser Val Lys Thr Lys Pro Ser Lys Leu Thr Tyr Val Val
1580                1585                1590

Gly Asp Ala Phe Asp Pro Ala Gly Leu Val Leu Gln Leu Asn Tyr
1595                1600                1605

Asp Asp Asp Ser Thr Gly Thr Val Thr Trp Asn Thr Gln Thr Ala
1610                1615                1620

Gly Asp Phe Thr Phe Lys Pro Ala Leu Asp Ala Lys Leu Lys Val
1625                1630                1635

Thr Asp Lys Thr Val Thr Val Thr Tyr Gln Gly Lys Ser Ala Val
1640                1645                1650

Ile Asp Ile Thr Val Ser Gln Pro Ala Pro Thr Val Ser Lys Thr
1655                1660                1665

Asp Leu Asp Lys Ala Ile Lys Ala Ile Glu Ala Lys Asn Pro Asp
1670                1675                1680

Ser Ser Lys Tyr Thr Ala Asp Ser Trp Lys Thr Phe Ala Asp Ala
1685                1690                1695

Met Ala His Ala Lys Ala Val Ile Ala Asp Asp Ser Ala Thr Gln
1700                1705                1710

Gln Asp Val Asp Lys Ala Leu Lys Ala Leu Thr Asp Ala Tyr Ala
1715                1720                1725

Gly Leu Thr Glu Lys Thr Pro Glu Pro Ala Pro Val Ser Lys Ser
1730                1735                1740

Glu Leu Asp Lys Lys Ile Lys Ala Ile Glu Ala Glu Lys Leu Asp
1745                1750                1755

Gly Ser Lys Tyr Thr Ala Glu Ser Trp Lys Ala Phe Glu Thr Ala
1760                1765                1770

Leu Ala His Ala Lys Ala Val Ile Ala Ser Asp Ser Ala Thr Gln
1775                1780                1785

Gln Asp Val Asp Ala Ala Leu Gly Ala Leu Thr Ser Ala Arg Asp
1790                1795                1800

Gly Leu Thr Glu Lys Gly Glu Val Lys Pro Asp Pro Lys Pro Glu
1805                1810                1815

Pro Gly Thr Val Asp Lys Ala Ala Leu Asp Lys Ala Val Lys Lys
1820                1825                1830

Val Glu Ala Glu Lys Leu Asp Gly Ser Lys Tyr Thr Ala Asp Ser
1835                1840                1845
```

```
Trp Lys Ala Phe Glu Thr Ala Leu Ala His Ala Lys Ala Val Ile
    1850                1855                1860

Gly Asn Ala Asn Ser Thr Gln Phe Asp Ile Asp Asn Ala Leu Ser
    1865                1870                1875

Met Leu Asn Asp Ala Arg Ala Ala Leu Lys Glu Lys Pro Gly Arg
    1880                1885                1890

Ile Ile Ala Ile Ile Asp Gly Ala Leu Ser Lys Thr Gly Ala
    1895                1900                1905

Ser Val Ala Ile Ile Ala Ser Val Ala Ala Ala Met Lys Ala Val
    1910                1915                1920

Gly Ala Gly Val Met Ala Leu Arg Pro Pro Lys Trp
    1925                1930                1935

<210> SEQ ID NO 5
<211> LENGTH: 2021
<212> TYPE: PRT
<213> ORGANISM: Ruminococcus torques

<400> SEQUENCE: 5

Met Lys Asn Leu Lys Trp Lys Lys Ala Gly Ser Ala Val Leu Ala Thr
1               5                   10                  15

Ala Leu Ala Gly Ser Met Val Leu Pro Ala Thr Ala Tyr Ala Gln Gly
            20                  25                  30

Glu Ile Val Gln Leu Glu Gly Gly Thr Ser Gln Thr Asn Thr Ala
        35                  40                  45

Pro Glu Gln Val Phe Leu Asn Lys Tyr Ser Gly Thr Val Arg Thr Gln
    50                  55                  60

Asn Phe Asn Asp Asn Trp Lys Phe Tyr Leu Gly Asp Ala Ser Gly Ala
65                  70                  75                  80

Gln Thr Pro Ala Phe Asp Asp Ser Ser Trp Gln Val Asn Leu Pro
            85                  90                  95

His Asp Tyr Ser Ile Asp Gln Lys Tyr Ser Gln Lys Met Glu Ala Glu
            100                 105                 110

Ser Gly Tyr Leu Pro Gly Gly Thr Gly Trp Tyr Arg Lys Asn Phe Thr
        115                 120                 125

Val Asp Glu Ser Leu Lys Gly Lys Arg Ile Ser Ile Asp Phe Gly Gly
    130                 135                 140

Val Tyr Met Asn Ala Thr Ile Tyr Val Asn Gly Lys Lys Leu Gly Thr
145                 150                 155                 160

His Pro Asn Gly Tyr Thr Pro Phe Ser Phe Asp Ile Thr Asp Asn Val
            165                 170                 175

Lys Phe Gly Lys Glu Asn Val Ile Ala Val Lys Val Asp His Gln Thr
            180                 185                 190

Pro Ser Ser Arg Phe Tyr Ser Gly Ser Gly Ile Tyr Arg Asp Val Asp
        195                 200                 205

Phe Val Val Thr Asp Thr Val His Val Asp Lys Asn Gly Thr Lys Ile
    210                 215                 220

Glu Thr Pro Asp Leu Lys Asp His Ala Asp Gly Asn Asn Val Ala Val
225                 230                 235                 240

Lys Val Lys Thr Thr Val Val Asn Glu Ser Glu Asn Asn Ala Ser Val
            245                 250                 255

Lys Val Lys His Thr Ile Tyr Pro Lys Asn Gly Thr Ala Glu Gln Ala
            260                 265                 270

Val Gly Thr Phe Glu Thr Glu Val Ala Thr Val Asp Lys Gly Lys Ser
        275                 280                 285
```

```
Lys Asp Val Gln Ala Asp Phe Thr Val Ser Gly Val Lys Leu Trp Ser
290                 295                 300
Thr Thr Thr Pro Asn Leu Tyr Thr Val Lys Thr Glu Val Leu Met Asp
305                 310                 315                 320
Gly Thr Thr Val Asp Thr Tyr Glu Thr Asp Tyr Gly Phe Arg Tyr Phe
                325                 330                 335
Asp Phe Asn Asn Asn Thr Gly Phe Ser Leu Asn Gly Gln Lys Met Lys
                    340                 345                 350
Leu Gln Gly Val Cys Met His His Asp Gln Gly Ala Leu Gly Ser Val
                355                 360                 365
Ala Asn Asp Arg Ser Thr Glu Arg Gln Val Glu Ile Leu Lys Met Met
370                 375                 380
Gly Cys Asn Ser Ile Arg Val Thr His Asn Pro Ala Ser Asp Glu Leu
385                 390                 395                 400
Ile Asp Ala Cys Asn Lys His Gly Ile Leu Val Ile Asp Glu Ala Phe
                405                 410                 415
Asp Gly Trp Val Ala Pro Lys Asn Ser Asn Ser Asn Asp Tyr Ser Lys
                420                 425                 430
Trp Phe Asn Lys Lys Ile Glu Asp Gly Asn Glu Ile Met Gly Ala Ala
                435                 440                 445
Glu Asn Met Thr Trp Ala Gln Phe Asp Leu Thr Ala Met Ile Glu Arg
450                 455                 460
Gly Gln Asn Asp Pro Ala Ile Ile Met Trp Ser Leu Gly Asn Glu Met
465                 470                 475                 480
Trp Glu Gly Thr Gly Gly Tyr Ser Asp Tyr Lys Thr Ala Gln Asp
                485                 490                 495
Asn Leu Val Lys Trp Ala Lys Ala Ala Asp Thr Thr Arg Pro Val Thr
                500                 505                 510
Thr Gly Asp Asn Lys Leu Lys Ser Asn Glu Thr Gly Ala Ile Thr Leu
                515                 520                 525
Gly Gln Glu Leu Gln Lys Ala Gly Gly Ile His Gly Met Asn Tyr Ser
530                 535                 540
Gln Glu Trp Lys Asn His Ala Gly Lys Thr His Tyr Asp Met Ile His
545                 550                 555                 560
Glu Ala Tyr Pro Glu Trp Cys Met Tyr Gly Ser Glu Thr Ala Ser Ala
                565                 570                 575
Val Asn Ser Arg Gly Ile Tyr Lys Gly Met Gly Ser Gln Thr Asp Tyr
                580                 585                 590
Gly Asp Tyr Asp Leu Thr Ser Tyr Asp Thr Ser Ala Val Gly Trp Gly
                595                 600                 605
Ala Thr Ala Ser Ser Ala Trp Tyr Glu Val Ile Lys Arg Asp Phe Ile
610                 615                 620
Ala Gly Glu Tyr Val Trp Thr Gly Phe Asp Tyr Ile Gly Glu Pro Thr
625                 630                 635                 640
Pro Trp Asn Gly Thr Gly Gln Gly Lys Pro Gly Asn Ala Ser Arg Trp
                645                 650                 655
Pro Ala Pro Lys Ser Ser Tyr Phe Gly Ile Val Asp Thr Ala Gly Leu
                660                 665                 670
Pro Lys Asp Ser Tyr Tyr Phe Tyr Gln Ser Gln Trp Asn Asp Ser Val
                675                 680                 685
Asn Thr Leu His Ile Leu Pro Ala Trp Asn Glu Glu Val Val Tyr Lys
                690                 695                 700
```

Lys Ser Gly Asn Asp Val Pro Val Val Val Tyr Ser Asp Ala Lys Lys
705                 710                 715                 720

Val Glu Leu Phe Phe Thr Pro Ala Ser Gly Gly Glu Gln Arg Ser Leu
            725                 730                 735

Gly Ala Lys Glu Phe Thr Glu Lys Lys Thr Thr Ala Gly Tyr Thr Tyr
            740                 745                 750

Gln Met Tyr Glu Gly Thr Gly Lys Ser Asn Thr Glu His Glu Asn Leu
            755                 760                 765

Tyr Met Thr Trp Met Val Pro Tyr Glu Ala Gly Thr Ile Thr Ala Lys
770                 775                 780

Ala Trp Asp Lys Asp Gly Lys Glu Ile Thr Glu Asn Leu Gln Gly Arg
785                 790                 795                 800

Thr Ser Val Thr Thr Ala Gly Glu Ala Lys Lys Leu Lys Val Asp Val
                805                 810                 815

Asp Arg Thr Lys Ile Thr Ala Asn Gly Glu Asp Leu Ser Tyr Leu Thr
                820                 825                 830

Val Ser Val Thr Asp Asp Lys Gly Asn Leu Val Pro Asn Ala Asp Asn
            835                 840                 845

Lys Val Thr Phe Glu Val Ser Gly Asp Gly Val Leu Ala Gly Val Asp
            850                 855                 860

Asn Gly Arg Pro Val Asp His Gln Ser Tyr Arg Asp Asp Asn Arg Lys
865                 870                 875                 880

Ala Phe Ser Gly Gln Leu Val Gly Ile Val Gln Ser Thr Lys Ser Ala
                885                 890                 895

Gly Thr Ile Thr Val Lys Val Lys Ala Glu Gly Met Glu Asp Gln Thr
            900                 905                 910

Val Thr Ile Thr Thr Thr Pro Ser Ser Asp Ser Ser Glu Ser Lys Lys
            915                 920                 925

Ala Ile Ser Ser Val Lys Met Ser Lys Ser Tyr Tyr Val Lys Val Gly
            930                 935                 940

Asn Gln Pro Gln Leu Pro Gly Gln Val Glu Val Leu Thr Asp Lys
945                 950                 955                 960

Thr Lys Thr Thr Gly Thr Val Thr Trp Glu Lys Ala Thr Ala Glu Gln
                965                 970                 975

Ile Gly Gln Ala Gly Thr Phe Ser Leu Thr Gly Thr Val Ser Val Glu
            980                 985                 990

Gly Val Glu Lys Ala Glu Thr Val  Ser Val Asn Val Asn  Met Ile Asp
                995                 1000                1005

Thr Val Ala Ala Leu Leu Asn Tyr Ser Thr Thr Thr  Ser Val Gly
    1010                1015                1020

Val Ala Pro Ser Leu Pro Thr  Ser Arg Pro Ala Val  Met Glu Asp
    1025                1030                1035

Gly Thr Val Leu Thr Ala Ala  Phe Pro Val Lys Trp  Glu Ala Pro
    1040                1045                1050

Glu Lys Gly Tyr Asp Ala Glu  Gly Ile Val Asn Val  Thr Gly Thr
    1055                1060                1065

Ala Asp Val Phe Gly Glu Ser  Met Pro Val Thr Ala  Thr Val Arg
    1070                1075                1080

Val Gln Glu Ala Glu Tyr Thr  Val Gly Asn Asn Val  Ala Lys Glu
    1085                1090                1095

Ala Met Thr Leu Ser Gln Asp  Ile Pro Gln Glu Met  Gln Ser Asp
    1100                1105                1110

Asp Leu Glu Ala Ile Arg Asp  Gly Asn Arg Thr Val  Asp Gly Asn

```
                    1115                1120                1125

Gln Gly Gly Asn Thr Asn Ser Thr Met Trp Ser Asn Tyr Lys Asn
                    1130                1135                1140

Ser Lys Asp Ala Lys Asp Asn Asp Ala Asp Ile Thr Phe Gln Tyr
                    1145                1150                1155

Ala Thr Gln Gln Ile Phe Asn Gln Ile Lys Ile Phe Phe Arg Ser
                    1160                1165                1170

Asp Ser His Ala Ala Ser Tyr Pro Ala Asp Asn Thr Thr Lys Ile
                    1175                1180                1185

Tyr Val Ser Glu Thr Gly Glu Gly Thr Trp Thr Glu Val Thr
                    1190                1195                1200

Ala Thr Glu Ser His Pro Glu Glu Leu Pro Ala Ile Gly Val Val
                    1205                1210                1215

Glu Tyr Thr Tyr Asp Phe Val Pro Thr Lys Ala Val Phe Val Lys
                    1220                1225                1230

Ile His Val Val Asn Pro Asp Ala Ser Gly Lys Gly Gly Gly
                    1235                1240                1245

Phe Thr Cys Thr Gly Ile Val Glu Ala Glu Leu Tyr Leu Ala Asn
                    1250                1255                1260

Gln Ala Asp Phe Thr Thr Asn Thr Thr Ala Lys Leu Glu Ser Leu
                    1265                1270                1275

Lys Ile Asn Glu Thr Ser Ala Pro Ala Glu Val Leu Ala Ala Gly
                    1280                1285                1290

Ala Gly Ser Trp Gly Thr Lys Glu Val Glu Ala Lys Thr Val Glu
                    1295                1300                1305

Ala Val Gly Ala Asp Asn Ala Ala Val Thr Val Leu Pro Thr Tyr
                    1310                1315                1320

Glu Asn Ala Val Arg Ile Ile Ile Glu Ser Glu Asp His Lys Thr
                    1325                1330                1335

Thr Asn Thr Phe Val Val Asn Leu Asp Ala Asp Ala Thr Asp Asp
                    1340                1345                1350

Ser Lys Asp Tyr Asp Lys Ala Lys Ile Thr Ser Thr Val Gly Ser
                    1355                1360                1365

Ala Gln Ser Gly Asn Glu Lys Glu Lys Ala Phe Asp Gly Asp Thr
                    1370                1375                1380

Asn Thr Leu Trp His Thr Gln Trp Asn Asn Thr Asn Pro Ala Glu
                    1385                1390                1395

Arg Trp Ile Glu Met Glu Leu Glu Asp Val Gln Asn Val Ile Gly
                    1400                1405                1410

Leu Arg Tyr Leu Pro Arg Gln Asn Gly Gly Gln Asn Gly Ile Val
                    1415                1420                1425

Lys Thr Tyr Lys Ile Glu Val Lys Ala Ala Glu Gly Asp Glu Trp
                    1430                1435                1440

Lys Glu Val Ala Val Thr Glu Gly Thr Lys Val Trp Ala Val Asp
                    1445                1450                1455

Asn Thr Trp Lys Met Ala Lys Phe Glu Thr Pro Val Gln Ala Lys
                    1460                1465                1470

Tyr Ile Arg Phe Ser Gly Val Glu Thr His Asp Asp Gln Gly Gly
                    1475                1480                1485

Asn Lys Trp Met Ser Ala Ala Glu Ile Arg Val Lys Val Thr Lys
                    1490                1495                1500

Glu Glu Val Val Pro Pro Thr Ala Thr Glu Leu Ser Leu Lys Ala
                    1505                1510                1515
```

-continued

Gln Pro Thr Lys Thr Ala Tyr Ala Val Gly Glu Lys Phe Asp Pro
1520                1525                1530

Ala Gly Leu Val Ile Gly Val Lys Tyr Ser Asp Gly Thr Glu Lys
1535                1540                1545

Glu Val Ala Tyr Gly Gln Asp Asn Ala Gly Glu Phe Thr Phe Asn
1550                1555                1560

Pro Thr Leu Ser Thr Ala Leu Thr Lys Asp Tyr Thr Lys Val Glu
1565                1570                1575

Val Gly Tyr Ala Gly Leu Lys Leu Asp Val Asn Ile Thr Val Ser
1580                1585                1590

Glu Ser Glu Pro Val Ile Pro Glu Ala Leu Glu Val Val Ser Ala
1595                1600                1605

Pro Ala Lys Thr Glu Tyr Glu Glu Gly Glu Met Phe Asn Pro Ala
1610                1615                1620

Gly Leu Ser Val Lys Ile Lys Tyr Ser Asp Gly Ser Tyr Gly Asp
1625                1630                1635

Glu Val Ala Tyr Gly Thr Ala Asn Ala Asp Gln Phe Thr Phe Asn
1640                1645                1650

Pro Thr Leu Asp Thr Ala Leu Lys Thr Ser Asp Glu Lys Val Thr
1655                1660                1665

Val Thr Tyr Ala Glu Lys Thr Ala Asp Ile Lys Ile Lys Val Asn
1670                1675                1680

Lys Lys Thr Pro Val Val Pro Glu Asn Pro Thr Val Glu Lys Val
1685                1690                1695

Glu Ile Lys Ala Asn Pro Ala Lys Thr Glu Tyr Lys Glu Gly Asp
1700                1705                1710

Lys Phe Asp Pro Thr Gly Leu Val Leu Thr Val Lys Tyr Asp Lys
1715                1720                1725

Gly Glu Asp Lys Glu Val Ala Tyr Gly Asp Ala Thr Lys Ala Asp
1730                1735                1740

Phe Thr Phe Ile Pro Ser Leu Asp Thr Ala Leu Lys Thr Ser Asp
1745                1750                1755

Glu Lys Val Thr Val Thr Tyr Ala Gly Lys Thr Ala Glu Ile Gly
1760                1765                1770

Ile Glu Val Lys Ala Asp Thr Pro Val Glu Pro Glu Lys Pro Thr
1775                1780                1785

Val Asp Lys Ile Ala Val Lys Val Pro Ala Lys Thr Thr Tyr
1790                1795                1800

Lys Ala Gly Glu Thr Phe Asp Pro Ser Gly Leu Val Leu Thr Val
1805                1810                1815

Thr Met Ser Asp Lys Thr Thr Lys Glu Val Ala Tyr Gly Asn Glu
1820                1825                1830

Thr Ala Lys Asp Phe Val Phe Asn Pro Thr Leu Asp Thr Ala Leu
1835                1840                1845

Thr Glu Gly Met Asn Lys Val Asp Val Thr Tyr Ala Gly Lys Thr
1850                1855                1860

Val Asp Ile Gly Ile Glu Val Lys Ala Asp Thr Pro Val Glu Pro
1865                1870                1875

Glu Lys Pro Thr Val Glu Lys Val Glu Ile Lys Ala Asn Pro Ala
1880                1885                1890

Lys Thr Glu Tyr Lys Ala Gly Glu Thr Phe Asp Pro Thr Gly Met
1895                1900                1905

```
Ser Leu Thr Val Thr Met Ser Asp Gly Thr Lys Val Val Ala
    1910                1915                1920

Tyr Gly Pro Glu Thr Ala Lys Asp Phe Ser Phe Asn Pro Ser Leu
    1925                1930                1935

Asn Thr Lys Leu Thr Ala Asp Thr Lys Lys Val Thr Val Thr Tyr
    1940                1945                1950

Gly Gly Gln Ser Ala Asp Val Ala Val Ser Val Lys Ala Asp Pro
    1955                1960                1965

Ser Glu Asp Lys Lys Pro Asn Thr Glu Lys Pro Asp Lys Gly Gly
    1970                1975                1980

Ala Val Gln Thr Gly Asp Asn Phe Asn Val Thr Leu Leu Ile Gly
    1985                1990                1995

Leu Val Val Leu Ala Gly Ala Val Ala Gly Gly Ala Ala Leu Thr
    2000                2005                2010

Ile Phe Lys Arg Asn Lys Arg Lys
    2015                2020

<210> SEQ ID NO 6
<211> LENGTH: 1355
<212> TYPE: PRT
<213> ORGANISM: Clostridium perfringens

<400> SEQUENCE: 6

Met Gln Ser Phe Asn Lys Arg Gly Thr Ala Leu Gly Ala Ala Ile Ala
1               5                   10                  15

Phe Ala Leu Thr Leu Ala Pro Thr Leu Val Met Ala Glu Thr Arg Gln
                20                  25                  30

Ile Pro Glu Ser Glu Thr Val Asn Val Gly Phe Ile Lys Asp Gly Glu
            35                  40                  45

Arg Ser Thr Ile Phe Asn Gln Asn Trp Lys Phe Lys Gly Asp Pro
        50                  55                  60

Ser Gly Ala Glu Gly Val Asp Phe Asp Asp Ser Ser Trp Arg Gly Leu
65                  70                  75                  80

Asn Leu Pro His Asp Trp Ser Ile Glu Gly Asp Phe Thr Val Glu Gly
                85                  90                  95

Glu Ala Glu Ser Gly Phe Leu Leu Gly Thr Gly Trp Tyr Arg Lys
            100                 105                 110

Ala Phe Val Val Pro Glu Lys Tyr Asn Ser Lys Asp Phe Thr Leu Asn
        115                 120                 125

Phe Asp Gly Val Tyr Met Asn Ala Glu Val Tyr Val Asn Gly Lys Lys
    130                 135                 140

Val Gly Glu His Asn Tyr Gly Tyr Thr Ser Phe Ala Phe Asp Ile Thr
145                 150                 155                 160

Glu Ala Leu Ile Cys Asp Gly Gln Thr Glu Asn Ile Ile Ala Val Lys
                165                 170                 175

Val Ser Asn Pro Val Pro Thr Ser Arg Trp Tyr Ser Gly Ser Gly Ile
            180                 185                 190

Tyr Arg Asp Val Thr Leu Ser Val Thr Asp Ser Ile His Val Ala His
        195                 200                 205

Ser Gly Thr Thr Val Thr Thr Pro Lys Leu Glu Glu Gln Lys Gly Gly
    210                 215                 220

Asp Val Asp Val Ala Ile Glu Thr Ile Val Glu Asn Glu Ser Lys Asp
225                 230                 235                 240

Asn Ser Met Val Thr Val Lys Ser Thr Val Val Asn Ser Lys Gly Glu
                245                 250                 255
```

Glu Val Ser Glu Ala Val Ile Asn Glu Gln Ser Ile Gly Val Asn Glu
            260                 265                 270

Ser Tyr Thr Phe Lys Gln Thr Ala Ile Val Asn Asn Pro Asp Leu Trp
            275                 280                 285

Ser Val Asp Asn Pro Asn Met Tyr Lys Val Lys Ser Glu Val Leu Leu
            290                 295                 300

Asp Gly Lys Val Ile Asp Thr Tyr Phe Thr Asp Phe Gly Phe Arg Tyr
305                 310                 315                 320

Tyr Asn Phe Asp Lys Asp Thr Gly Phe Ser Leu Asn Gly Glu Asn Met
            325                 330                 335

Lys Leu Lys Gly Val Cys Met His His Asp Gln Gly Ala Leu Gly Ala
            340                 345                 350

Ala Ser Tyr Tyr Arg Ala Val Glu Arg Gln Met Glu Lys Met Lys Glu
            355                 360                 365

Met Gly Val Asn Ala Ile Arg Val Ser His Asn Pro Ala Ser Glu Met
            370                 375                 380

Leu Leu Glu Ile Cys Asn Arg Leu Gly Leu Leu Val Ile Asn Glu Ala
385                 390                 395                 400

Phe Asp Thr Trp Thr Asn Pro Lys Asn Gly Asn Val Asn Asp Phe Ser
            405                 410                 415

Lys Tyr Phe Asn Glu Val Ile Gly Glu Asp Asn Glu Ile Leu Asn Gly
            420                 425                 430

Ser Pro Glu Met Thr Trp Gly Glu Phe Glu Ala Arg Ser Met Val Lys
            435                 440                 445

Asn Ser Lys Asn Asn Pro Ser Ile Ile Met Trp Ser Ile Gly Asn Glu
            450                 455                 460

Val Leu Glu Gly Ile Ser Gly Ser Ala Ser Asn Tyr Thr Asn Val Ala
465                 470                 475                 480

Gln Asn Ile Ile Asp Trp Ile Lys Asp Glu Asp Glu Thr Arg His Val
            485                 490                 495

Thr Ile Gly Asp Asn Arg Thr Lys Asn Gly Asp Arg Thr Ala Glu Ala
            500                 505                 510

Ile Ser Glu Val Val Asp Asp Asn Gly Gly Leu Val Gly Phe Asn Tyr
            515                 520                 525

Ala Asn Glu Thr Gln Val Ala Gln Gln Arg Ala Asn His Pro Asp Trp
            530                 535                 540

Thr Leu Tyr Ala Ser Glu Thr Ser Ser Ala Ile His Thr Arg Gly Tyr
545                 550                 555                 560

Tyr Lys Thr Lys Gly Ile Asp Tyr Gly Asn His Arg Ile Ser Glu Tyr
            565                 570                 575

Asp Asn Asn Gln Thr Lys Val Gly Trp Gly His Ser Ala Ser Asp Ala
            580                 585                 590

Trp Lys Phe Val Ile Lys Asn Asp Tyr Asn Ala Gly Glu Leu Val Trp
            595                 600                 605

Thr Gly Phe Asp Tyr Ile Gly Glu Pro Thr Pro Trp Asn Gly Thr Gly
            610                 615                 620

Thr Gly Thr Val Gly Gly Gly Asn Gly Ala Ala Pro Lys Ser Ser Tyr
625                 630                 635                 640

Phe Gly Ile Val Asp Thr Ala Gly Phe Glu Lys Asp Ile Tyr Tyr Leu
            645                 650                 655

Tyr Gln Ser Gln Trp Asn Asp Asp Val Asn Thr Leu His Val Leu Pro
            660                 665                 670

-continued

Thr Trp Asn Arg Glu Asp Ile Val Ile Glu Asn Gly Asn Val Glu Val
            675                 680                 685

Asn Val Phe Thr Asp Ala His Lys Val Glu Leu Tyr Leu Asn Asp Lys
        690                 695                 700

Lys Val Gly Glu Gln Thr Ser Thr Glu His Thr Thr Asp Ala Gly Tyr
705                 710                 715                 720

Lys Tyr Tyr Thr Phe Gly Asn Asp Ser Leu Tyr Pro Val Phe Asn Val
            725                 730                 735

Pro Tyr Glu Glu Gly Thr Leu Thr Ala Lys Ala Tyr Asp Lys Glu Gly
        740                 745                 750

Asn Glu Ile Thr Asn Thr Glu Gly Arg Asn Thr Val Lys Thr Thr Gly
        755                 760                 765

Glu Ala Ser Thr Val Arg Leu Ser Ala Asp Arg Asp Thr Ile Asp Ser
        770                 775                 780

Asp Gly Tyr Asp Leu Ser Tyr Ile Thr Val Asp Ile Val Asp Glu Asp
785                 790                 795                 800

Gly Asn Ile Val Gln Asn Ala Asp Asn Arg Leu Asn Phe Gln Leu Glu
            805                 810                 815

Gly Asp Gly Lys Ile Val Gly Val Asp Asn Gly Asp Gln Thr Asp Thr
        820                 825                 830

Asp Ser Tyr Lys Pro Thr Ser Asp Thr Glu Ala Ser Arg Lys Ala Leu
        835                 840                 845

Ser Gly Lys Ala Leu Val Ile Val Gln Ser Thr Lys Asp Ala Gly Asn
850                 855                 860

Ile Arg Leu Asn Val Ser Gly Glu Gly Leu Gln Ser Gln Ser Ile Glu
865                 870                 875                 880

Ile Asn Thr Val Asn Asn Ala Gly Glu Asp Lys Phe Leu Glu Ser Tyr
            885                 890                 895

Glu Ile Val Lys Asp Tyr Tyr Val Asn Leu Asn Glu Lys Pro Glu Leu
        900                 905                 910

Pro Ser Thr Val Glu Gly Arg Tyr Ser Asp Gly Thr Thr Glu Thr Phe
        915                 920                 925

Asn Ile Ser Trp Asn Asp Tyr Asp Glu Ser Gln Leu Asn Thr Pro Gln
930                 935                 940

Val Phe Lys Ile Asn Gly Lys Leu Glu Gly Thr Asp Val Ala Val Asn
945                 950                 955                 960

Val Asn Val His Val Ile Gly Asp Val Val Ser Met Glu Asn Tyr Ser
            965                 970                 975

Thr Phe Thr Tyr Ala Gly Gln Thr Pro Thr Leu Pro Lys Thr Val Lys
        980                 985                 990

Gly Tyr Leu Ala Asp Gly Asn Glu Ser Glu Glu Phe Lys Val Asp Trp
        995                 1000                1005

Asn Leu Glu Gly Val Asp Phe Ser Glu Pro Asn Thr Thr Val Glu
    1010            1015            1020

Val Leu Gly Glu Val Ser Leu Leu Gly Lys Thr Tyr Thr Val Thr
    1025            1030            1035

Ser Thr Val Arg Val Val Glu Ala Leu Lys Ala Ala Ala Asn Leu
    1040            1045            1050

Ala Ile Asn Asn Ser Ser Asn Lys Asp Val Pro Ala Leu Ser Gln
    1055            1060            1065

Ser Cys Val Ser Thr Ala Asp Asn Leu Asn Ser Ile Asn Asn Gly
    1070            1075            1080

Ile Thr Asn Asn Ser Ser Asn Thr Gly Glu Arg Trp Thr Asn Trp

```
                    1085                1090               1095

Asn Glu Arg Asn Leu Thr Glu Asn Gly Glu Pro Lys Gly Ala Tyr
        1100                1105               1110

Val Gln Leu Asp Trp Lys Asn Lys Tyr Asn Ile Asp Arg Leu Asp
        1115                1120               1125

Leu Trp Leu Phe Thr Asp Asn Ile Tyr Gly Arg Ile Pro Lys Lys
        1130                1135               1140

Val Glu Ile Ser Tyr Lys Asn Glu Ala Gly Glu Tyr Glu Val Val
        1145                1150               1155

Thr His Ser Asn Thr Thr Glu Val Ser Tyr Leu Ala Gly Glu Thr
        1160                1165               1170

Thr Tyr Phe Leu Asp Lys Val Ile Asn Thr Asp Ser Ile Arg Val
        1175                1180               1185

Tyr Met Gln Gln Pro Glu Val Gly Lys Cys Ile Gly Leu Ser Glu
        1190                1195               1200

Val Ala Val Tyr Glu Tyr Val Pro Gln Val Ser Ala Asn Glu Gly
        1205                1210               1215

Asn Lys Leu Ser Glu Ile Lys Leu Asp Gly Glu Ala Leu Glu Gly
        1220                1225               1230

Phe Asn Pro Asp Thr Asn Glu Tyr Thr Val Asn Leu Lys Glu Leu
        1235                1240               1245

Pro Lys Thr Val Glu Ala Ser Gly Glu Glu Asn Val Ala Ile Thr
        1250                1255               1260

Ile Leu Pro Val His Asn Asn Lys Ser Ile Ile Ile Ala Arg Ser
        1265                1270               1275

Glu Ser Gly Ala Lys Asn Ile Tyr Thr Val Asn Tyr Val Leu Glu
        1280                1285               1290

Glu Ser Glu Gly Ser Ala Asp Ile Asn Glu Asp Gly Ser Ile Asn
        1295                1300               1305

Val Gly Asp Leu Ser Ile Val Ser Lys Tyr Gln Gly Glu Val Ile
        1310                1315               1320

Ser Gly Asn Ala Leu Ser Glu Lys Ser Asp Ile Asn Lys Asp Gly
        1325                1330               1335

Val Val Asp Lys Ala Asp Ile Gln Ile Val Met Gly Lys Ile Leu
        1340                1345               1350

Gly Glu
    1355

<210> SEQ ID NO 7
<211> LENGTH: 1355
<212> TYPE: PRT
<213> ORGANISM: Clostridium perfringens

<400> SEQUENCE: 7

Met Gln Ser Phe Asn Lys Arg Gly Thr Ala Leu Gly Ala Ala Ile Ala
1               5                   10                  15

Phe Ala Leu Thr Leu Ala Pro Thr Leu Val Met Ala Glu Thr Arg Gln
                20                  25                  30

Ile Pro Glu Ser Glu Thr Val Asn Val Gly Phe Ile Lys Asp Gly Glu
            35                  40                  45

Arg Ser Thr Ile Phe Asn Gln Asn Trp Lys Phe Phe Lys Gly Asp Pro
        50                  55                  60

Ser Gly Ala Glu Gly Val Asp Phe Asp Asp Ser Ser Trp Arg Gly Leu
65                  70                  75                  80
```

```
Asn Leu Pro His Asp Trp Ser Ile Glu Gly Asp Phe Thr Val Glu Gly
                 85                  90                  95

Glu Ala Glu Ser Gly Phe Leu Gly Gly Thr Gly Trp Tyr Arg Lys
            100                 105                 110

Ala Phe Val Val Pro Glu Lys Tyr Asn Gly Lys Asp Phe Thr Leu Asn
            115                 120                 125

Phe Asp Gly Val Tyr Met Asn Ala Glu Val Tyr Val Asn Gly Lys Lys
130                 135                 140

Val Gly Glu His Asn Tyr Gly Tyr Thr Ser Phe Ala Phe Asp Ile Thr
145                 150                 155                 160

Glu Ala Leu Ile Cys Asp Gly Gln Thr Glu Asn Ile Ile Ala Val Lys
                165                 170                 175

Val Ser Asn Pro Val Pro Thr Ser Arg Trp Tyr Ser Gly Ser Gly Ile
            180                 185                 190

Tyr Arg Asp Val Thr Leu Ser Val Thr Asp Ser Ile His Val Ala His
        195                 200                 205

Ala Gly Thr Thr Val Thr Thr Pro Lys Leu Glu Glu Gln Lys Asp Gly
    210                 215                 220

Asp Val Asp Val Ala Ile Glu Thr Ile Val Glu Asn Glu Ser Lys Asp
225                 230                 235                 240

Asn Ser Met Val Thr Val Lys Ser Thr Val Val Asn Ser Lys Gly Glu
                245                 250                 255

Glu Val Ser Glu Ser Val Ile Asn Glu Lys Ser Ile Gly Ala Asn Glu
            260                 265                 270

Ser Tyr Thr Phe Asn Gln Thr Ala Ile Val Asn Asn Pro Gly Leu Trp
        275                 280                 285

Ser Val Asp Asn Pro Asn Met Tyr Lys Val Lys Ser Glu Val Leu Val
    290                 295                 300

Asp Gly Asn Val Ile Asp Thr Tyr Phe Thr Asp Phe Gly Phe Arg Tyr
305                 310                 315                 320

Tyr Asn Phe Asp Lys Asp Thr Gly Phe Ser Leu Asn Gly Glu Asn Ile
                325                 330                 335

Lys Leu Lys Gly Val Cys Met His His Asp Gln Gly Ala Leu Gly Ala
            340                 345                 350

Ala Ser Tyr Tyr Arg Ala Val Glu Arg Gln Met Glu Lys Met Lys Glu
        355                 360                 365

Met Gly Val Asn Ala Ile Arg Val Ser His Asn Pro Ala Ser Glu Met
    370                 375                 380

Leu Leu Glu Ile Cys Asn Arg Leu Gly Leu Leu Val Ile Asn Glu Ala
385                 390                 395                 400

Phe Asp Thr Trp Thr Asn Pro Lys Asn Gly Asn Val Asn Asp Phe Ser
                405                 410                 415

Lys Tyr Phe Asn Glu Val Ile Gly Glu Asp Asn Glu Ile Leu Asn Gly
            420                 425                 430

Ser Pro Glu Met Thr Trp Gly Glu Phe Glu Ala Arg Ser Met Val Lys
        435                 440                 445

Asn Ser Lys Asn Asn Pro Ser Ile Ile Met Trp Ser Ile Gly Asn Glu
    450                 455                 460

Val Leu Glu Gly Ile Ser Gly Ser Ala Ser Tyr Thr Asn Val Ala
465                 470                 475                 480

Gln Asn Ile Ile Asp Trp Ile Lys Asp Glu Asp Glu Thr Arg His Val
                485                 490                 495

Thr Ile Gly Asp Asn Arg Thr Lys Asn Gly Asp Arg Thr Ala Glu Ala
```

```
            500                 505                 510
Ile Ser Glu Val Val Asp Asp Asn Asp Gly Leu Val Gly Phe Asn Tyr
        515                 520                 525

Ala Asn Glu Ala Gln Val Ala Gln Gln Arg Ala Asn His Pro Asp Trp
        530                 535                 540

Thr Leu Tyr Ala Ser Glu Thr Ser Ser Ala Ile His Thr Arg Gly Tyr
545                 550                 555                 560

Tyr Lys Thr Lys Gly Ile Asp Tyr Ser Asn His Arg Ile Ser Glu Tyr
                565                 570                 575

Asp Asn Asn Gln Thr Arg Val Gly Trp Gly His Ser Ala Ser Asp Ala
            580                 585                 590

Trp Lys Phe Val Ile Lys Asn Asp Tyr Asn Ala Gly Glu Phe Val Trp
        595                 600                 605

Thr Gly Phe Asp Tyr Ile Gly Glu Pro Thr Pro Trp Asn Gly Thr Gly
        610                 615                 620

Thr Gly Thr Val Gly Gly Asn Gly Ala Ala Pro Lys Ser Ser Tyr
625                 630                 635                 640

Phe Gly Ile Val Asp Thr Ala Gly Phe Glu Lys Asp Ile Tyr Tyr Leu
                645                 650                 655

Tyr Gln Ser Gln Trp Asn Asp Asp Val Asn Thr Leu His Val Leu Pro
            660                 665                 670

Thr Trp Asn Arg Glu Asp Ile Val Ile Glu Asn Gly Asn Val Glu Val
        675                 680                 685

Asn Val Phe Thr Asp Ala His Lys Val Glu Leu Tyr Leu Asn Asp Glu
        690                 695                 700

Lys Ile Gly Glu Gln Thr Ser Thr Glu His Thr Thr Asp Ala Gly Tyr
705                 710                 715                 720

Lys Tyr Tyr Thr Phe Gly Asn Asp Ser Leu Tyr Pro Val Phe Asn Val
                725                 730                 735

Pro Tyr Lys Glu Gly Thr Leu Thr Ala Arg Ala Tyr Asp Lys Glu Gly
            740                 745                 750

Asn Glu Ile Thr Asn Thr Glu Gly Arg Asn Thr Val Lys Thr Thr Gly
        755                 760                 765

Glu Ala Ser Thr Val Arg Leu Ser Ala Asp Arg Asp Thr Ile Asp Ser
        770                 775                 780

Asp Gly Tyr Asp Leu Ser Tyr Ile Thr Val Asp Ile Val Asp Glu Asn
785                 790                 795                 800

Gly Asn Ile Val Gln Asn Ala Asp Asn Arg Leu Asn Phe Glu Leu Glu
                805                 810                 815

Gly Asn Gly Lys Ile Val Gly Val Asp Asn Gly Asp Gln Thr Asp Thr
            820                 825                 830

Asp Ser Tyr Lys Pro Thr Ser Asp Thr Glu Ala Ser Arg Lys Ala Leu
        835                 840                 845

Ser Gly Lys Ala Leu Val Ile Val Gln Ser Thr Lys Asp Ala Gly Asn
        850                 855                 860

Ile Arg Leu Asn Val Ser Gly Glu Gly Leu Gln Ser Gln Ser Ile Glu
865                 870                 875                 880

Ile Asn Thr Val Asn Asn Ala Gly Glu Asp Lys Phe Leu Glu Ser Tyr
                885                 890                 895

Glu Ile Val Lys Asp Tyr Tyr Val Asn Leu Asn Glu Lys Pro Glu Leu
            900                 905                 910

Pro Ser Thr Val Glu Gly Arg Tyr Ser Asp Gly Thr Thr Glu Thr Phe
        915                 920                 925
```

-continued

```
Asn Ile Ser Trp Asn Asp Tyr Asp Glu Ser Gln Leu Asn Thr Pro Gln
    930             935                 940

Val Phe Lys Ile Asn Gly Lys Leu Glu Gly Thr Asp Val Ala Val Asn
945             950                 955                 960

Val Asn Val His Val Ile Gly Asp Val Val Ser Met Glu Asn Tyr Ser
                965                 970                 975

Thr Phe Thr Tyr Ala Gly Gln Thr Pro Thr Leu Pro Lys Thr Val Lys
                980                 985                 990

Gly Tyr Leu Ala Asp Gly Asn Glu  Ser Glu Glu Phe Lys  Val Asp Trp
                995                 1000                1005

Asn Leu Glu Gly Val Asp Phe  Ser Glu Pro Asn Thr  Thr Val Glu
    1010                1015                1020

Val Leu Gly Glu Val Ser Leu  Leu Gly Lys Thr Tyr  Thr Val Thr
    1025                1030                1035

Ser Thr Val Arg Val Val Glu  Ala Leu Lys Ala Ala  Ala Asn Leu
    1040                1045                1050

Ala Ile Asn Lys Asp Thr Asn  Lys Asp Val Pro Ala  Leu Ser Gln
    1055                1060                1065

Ser Cys Val Ser Gln Ala Asp  Asn Leu Asn Ser Ile  Asn Asn Gly
    1070                1075                1080

Ile Thr Asn Asn Gly Thr Asp  Thr Arg Glu Arg Trp  Thr Asn Trp
    1085                1090                1095

Asn Glu Arg Asp Leu Thr Val  Asn Gly Glu Pro Lys  Gly Ala Tyr
    1100                1105                1110

Val Gln Leu Asp Trp Glu Asn  Lys Tyr Asn Ile Asp  Arg Leu Asp
    1115                1120                1125

Leu Trp Leu Phe Thr Asp Asn  Ile Tyr Gly Arg Ile  Pro Lys Lys
    1130                1135                1140

Val Glu Ile Ser Tyr Lys Asn  Glu Ala Gly Glu Tyr  Glu Val Val
    1145                1150                1155

Thr His Ser Asn Thr Thr Glu  Val Ser Tyr Leu Ala  Gly Glu Thr
    1160                1165                1170

Thr Tyr Phe Leu Asp Lys Val  Ile Asn Thr Asp Ser  Ile Arg Val
    1175                1180                1185

Tyr Met Gln Gln Pro Glu Val  Gly Lys Cys Ile Gly  Leu Ser Glu
    1190                1195                1200

Val Ala Val Tyr Glu Tyr Val  Pro Gln Val Ser Ala  Asn Glu Gly
    1205                1210                1215

Asn Lys Leu Ser Glu Ile Lys  Leu Asp Gly Glu Ala  Leu Glu Gly
    1220                1225                1230

Phe Asn Pro Asp Thr Asn Glu  Tyr Thr Val Asn Leu  Lys Glu Leu
    1235                1240                1245

Pro Lys Thr Val Glu Ala Ser  Gly Glu Glu Asn Val  Ala Ile Thr
    1250                1255                1260

Ile Leu Pro Val His Asn Asn  Lys Ser Ile Ile Ile  Ala Arg Ser
    1265                1270                1275

Glu Ser Gly Ala Lys Asn Ile  Tyr Thr Val Asn Tyr  Val Leu Glu
    1280                1285                1290

Glu Ser Glu Gly Ser Ala Asp  Ile Asn Glu Asp Gly  Ser Ile Asn
    1295                1300                1305

Val Gly Asp Leu Ser Ile Val  Ser Lys Tyr Gln Gly  Glu Ile Ile
    1310                1315                1320
```

```
Ser Gly Asn Ala Leu Ser Glu     Lys Ser Asp Ile Asn     Lys Asp Gly
    1325                1330                    1335

Val Val Asp Lys Ala Asp Ile     Gln Ile Val Met Gly     Lys Ile Leu
    1340                1345                    1350

Gly Glu
    1355
```

METHOD FOR PRODUCING A DAIRY PRODUCT

CROSS-REFERENCE TO RELATED APPLICATIONS

This application is a continuation of U.S. application Ser. No. 12/744,508 filed May 25, 2010, now abandoned, which is a 35 U.S.C. 371 national application of PCT/EP2008/066624 filed Dec. 2, 2008 which claims priority or the benefit under 35 U.S.C. 119 of European application nos. 07122110.5 and 08156674.7 filed Dec. 3, 2007 and May 21, 2008, respectively, and U.S. provisional application Nos. 61/055,164 and 60/992,783 filed May 22, 2008 and Dec. 6, 2007, respectively, the contents of which are fully incorporated herein by reference.

SEQUENCE LISTING

The present invention comprises a sequence listing.

TECHNICAL FIELD

The present invention relates to a method for producing a dairy product using an enzyme having lactase activity.

BACKGROUND OF THE INVENTION

Lactose intolerance is perhaps the best-known food sensitivity in the United States and other parts of the world. It is estimated that about 70% of the world's population has a genetically controlled limited ability to digest lactose. Therefore, to help dairy maldigesters keep dairy foods in their diet, there is a growing demand for dairy food products that contain no or only low levels of lactose.

Lactase is used commercially to break down lactose in milk to produce dairy products which are suitable for people with lactose intolerance and/or have a sweeter taste. Because glucose and galactose are sweeter than lactose, lactase produces a more pleasant taste. Lactase is also used in the manufacture of ice cream. Lactose crystallises at the low temperatures of ice cream, whereas glucose and galactose stay liquid and contribute to a smoother texture. Lactase is also used in the conversion of whey into syrup. Lactase is also used for production of condensed milk.

Lactases have been isolated from a large variety of organisms, including microorganisms. Lactase is often an intracellular component of microorganisms like *Kluyveromyces* and *Bacillus*. *Kluyveromyces*, especially *K. fragilis* and *K. lactis*, and other fungi such as those of the genera *Candida*, *Torula* and *Torulopsis*, are a common source of fungal lactases, whereas *B. coagulans* and *B circulans* are well known sources for bacterial lactases. Several commercial lactase preparations derived from these organisms are available such as Lactozym® (available from Novozymes, Denmark), HA-Lactase (available from Chr. Hansen, Denmark) and Maxilact® (available from DSM, the Netherlands), all from *K. lactis*. All these lactases are so called neutral lactases having a pH optimum between pH 6 and pH 8. When such lactases are used in the production of, e.g., low-lactose yoghurt, the enzyme treatment will either have to be done in a separate step before fermentation or rather high enzyme dosages have to be used, because their activity drop as the pH decreases during fermentation. Also, these lactases are not suitable for hydrolysis of lactose in milk performed at high temperature, which would in some cases be beneficial to keep the microbial count low and thus ensure good milk quality.

Several extracellular lactases have been described having a lower pH optimum, see, e.g., U.S. Pat. No. 5,736,374 which describes an example of such lactase, produced by *Aspergillus oryzae*.

A lactase from *Bifidobacterium bifidum* has been described having a high transgalactosylating activity, both in the full-length form and especially when truncated from the C-terminal end (see, e.g., Jørgensen et al. (2001), *Appl. Microbiol. Biotechnol.*, 57: 647-652 or EP patent 1,283,876).

It is an object of the present invention to provide a method for production of dairy products, e.g. fermented dairy products, such as yoghurt, having a low level of lactose by using a lactase. It is also an object to provide a method for production of low-lactose beverage milk having an extended shelf-life by using a lactase, where the method gives rise to low formation of off-flavour and/or low formation of brown colour as compared to known methods. Lactase to be used according to the invention should hydrolyse lactose efficiently and optimally allow for almost complete lactose hydrolysis. Especially, such lactase should have a high ratio of lactase to transgalactosylase activity. For use in the production of fermented dairy products, the lactase should be active over a broad pH range.

SUMMARY OF THE INVENTION

The present inventors have surprisingly found that a C-terminally truncated fragment of the extracellular lactase from *Bifidobacterium bifidum*, which was originally isolated and patented for its ability to make high amounts of galactooligosaccharides from lactose, can be used very successfully for hydrolysis of lactose in milk. When tested in water+100 g/l lactose at 37° C., the enzyme makes galactooligosaccharides with high efficiency as described in the prior art. However, when tested in milk, the ratio of hydrolytic to transgalactosylating activity has changed markedly, resulting in efficient hydrolysis and very low production of galactooligosaccharides.

Consequently, the present invention relates to a method for producing a dairy product comprising
a) providing a milk-based substrate comprising lactose; and
b) treating said substrate with an enzyme having lactase activity and having an amino acid sequence which is at least 70% identical to amino acids 28-1931 of SEQ ID NO: 1 or a fragment thereof.

In a preferred aspect, the invention relates to a method for producing a dairy product comprising
a) providing a milk-based substrate comprising lactose; and
b) treating said substrate with an enzyme having lactase activity and having an amino acid sequence which is at least 70% identical to amino acids 28-1331 of SEQ ID NO: 2.

Further, the inventors have surprisingly found that very low levels of lactose can be achieved when using the lactase from *Bifidobacterium bifidum* as compared to other lactases typically used for treatment of milk. Another unexpected advantage of using the lactase from *Bifidobacterium bifidum* is that the enzyme is active at high temperatures, allowing for treatment of the milk at, e.g., 52° C., thus reducing the microbial count and thereby improving the quality of the milk.

Therefore, in another aspect, the present invention relates to a method for producing a dairy product comprising a) providing a milk-based substrate comprising lactose, and b) treating said substrate with an enzyme having lactase activity, where step b) takes place at a temperature of at least 50° C.

In a preferred embodiment, step b) takes place at a temperature of at least 52° C.

Also, the inventors have surprisingly found that the lactase from *Bifidobacterium bifidum* is active over a broad pH range.

Therefore, in another aspect, the present invention relates to a method for producing a dairy product comprising a) providing a milk-based substrate comprising lactose, and b) treating said substrate with an enzyme having lactase activity, where the pH optimum of the lactase activity at 37° C. is above pH 5, and where the lactase activity of the enzyme at pH 5 is at least 50% of its lactase activity at pH 6 when measured at 37° C.

Use of a lactase enzyme being active over a broad pH spectrum is especially useful for the production of fermented dairy products, where it allows for low enzyme dosage, since the enzyme is still active during and after fermentation. Also, very low levels of lactose in the fermented dairy product can be reached using such enzyme.

Therefore, in a preferred aspect, the present invention relates to a method for producing a low-lactose fermented dairy product comprising a) providing a milk-based substrate comprising lactose, b) treating said substrate with an enzyme having lactase activity, where the pH optimum of the lactase activity at 37° C. is above pH 5, and where the lactase activity of the enzyme at pH 5 is at least 50% of its lactase activity at pH 6 when measured at 37° C., and c) fermenting said substrate with a microorganism.

The present inventors have also surprisingly found that in the manufacture of low-lactose beverage milk having an extended shelf life, the lactose hydrolysis can preferentially be carried out at high temperature, such as at a temperature of at least 60° C. Preferentially, such manufacture may comprise simultaneous low-pasteurization and lactase treatment.

Therefore, in a preferred aspect, the present invention relates to a method for producing a dairy product comprising a) providing a milk-based substrate comprising lactose, and b) treating said substrate with an enzyme having lactase activity, wherein step b) is performed for between 10 minutes and 4 hours at a temperature of between 62° C. and 64° C.

In a more preferred aspect, step b) in such method is followed by cooling to below 10° C. without further heat treatment. This will allow for the enzyme to be still active after the milk has been cooled, i.e. during its storage. In another more preferred aspect, step b) in such method is followed by UHT treatment.

Preferably, in the methods of the invention, at least 70% of the lactose in the milk-based substrate is hydrolysed. More preferably, at least 80%, such as at least 85%, at least 90%, at least 95% or at least 98%, of the lactose in the milk-based substrate is hydrolysed.

In another aspect, the present invention relates to a method for producing a dairy product comprising a) providing a milk-based substrate comprising lactose; and b) treating said substrate with an enzyme having lactase activity and having an amino acid sequence which is at least 70% identical to SEQ ID NO: 3 or a fragment thereof.

In another aspect, the present invention relates to a method for producing a dairy product comprising a) providing a milk-based substrate comprising lactose; and b) treating said substrate with an enzyme having lactase activity and having an amino acid sequence which is at least 70% identical to SEQ ID NO: 4 or a fragment thereof.

In another aspect, the present invention relates to a method for producing a dairy product comprising a) providing a milk-based substrate comprising lactose; and b) treating said substrate with an enzyme having lactase activity and having an amino acid sequence which is at least 70% identical to SEQ ID NO: 5 or a fragment thereof.

In another aspect, the present invention relates to a method for producing a dairy product comprising a) providing a milk-based substrate comprising lactose; and b) treating said substrate with an enzyme having lactase activity and having an amino acid sequence which is at least 70% identical to SEQ ID NO: 6 or a fragment thereof.

In yet another aspect, the present invention relates to a method for producing a dairy product comprising a) providing a milk-based substrate comprising lactose; and b) treating said substrate with an enzyme having lactase activity and having an amino acid sequence which is at least 70% identical to SEQ ID NO: 7 or a fragment thereof.

DETAILED DISCLOSURE OF THE INVENTION

Milk-Based Substrate

The term "milk", in the context of the present invention, is to be understood as the lacteal secretion obtained by milking any mammal, such as cows, sheep, goats, buffaloes or camels.

"Milk-based substrate", in the context of the present invention, may be any raw and/or processed milk material. Useful milk-based substrates include, but are not limited to solutions/suspensions of any milk or milk like products comprising lactose, such as whole or low fat milk, skim milk, buttermilk, reconstituted milk powder, condensed milk, solutions of dried milk, UHT milk, whey, whey permeate, acid whey, or cream.

Preferably, the milk-based substrate is milk or an aqueous solution of skim milk powder.

The milk-based substrate may be more concentrated than raw milk.

In one embodiment, the milk-based substrate has a ratio of protein to lactose of at least 0.2, preferably at least 0.3, at least 0.4, at least 0.5, at least 0.6 or, most preferably, at least 0.7.

The milk-based substrate may be homogenized and pasteurized according to methods known in the art.

"Homogenizing" as used herein means intensive mixing to obtain a soluble suspension or emulsion. It may be performed so as to break up the milk fat into smaller sizes so that it no longer separates from the milk. This may be accomplished by forcing the milk at high pressure through small orifices.

"Pasteurizing" as used herein means reducing or eliminating the presence of live organisms, such as microorganisms, in the milk-based substrate. Preferably, pasteurization is attained by maintaining a specified temperature for a specified period of time. The specified temperature is usually attained by heating. The temperature and duration may be selected in order to kill or inactivate certain bacteria, such as harmful bacteria, and/or to inactivate enzymes in the milk. A rapid cooling step may follow.

Dairy Product

A "dairy product" in the context of the present invention may be any food product wherein one of the major constituents is milk-based. Preferable, the major constituent is milk-based. More preferably, the major constituent is a milk-based substrate which has been treated with an enzyme having lactase activity according to a method of the invention. In the context of the present invention "one of the major constituents" means a constituent having a dry matter which constitutes more than 20%, preferably more than 30% or more than 40% of the total dry matter of the dairy product, whereas "the major constituent" means a constituent having a dry matter which constitutes more than 50%, preferably more than 60% or more than 70% of the total dry matter of the dairy product.

A dairy product according to the invention may be, e.g., skim milk, low fat milk, whole milk, cream, UHT milk, milk having an extended shelf life, a fermented milk product, cheese, yoghurt, butter, dairy spread, butter milk, acidified milk drink, sour cream, whey based drink, ice cream, condensed milk, dulce de leche or a flavoured milk drink. A dairy product may be manufactured by any method known in the art.

A dairy product may additionally comprise non-milk components, e.g. vegetable components such as, e.g., vegetable oil, vegetable protein, and/or vegetable carbohydrates. Dairy products may also comprise further additives such as, e.g., enzymes, flavouring agents, microbial cultures such as probiotic cultures, salts, sweeteners, sugars, acids, fruit, fruit juices, or any other component known in the art as a component of, or additive to, a dairy product.

In one embodiment of the invention, one or more milk components and/or milk fractions account for at least 50% (weight/weight), such as at least 70%, e.g. at least 80%, preferably at least 90%, of the dairy product.

In one embodiment of the invention, one or more milk-based substrates having been treated with an enzyme having lactase activity according to a method of the invention account for at least 50% (weight/weight), such as at least 70%, e.g. at least 80%, preferably at least 90%, of the dairy product.

In one embodiment of the invention, the dairy product is a dairy product which is not enriched by addition of galactooligosaccharides.

In one embodiment of the invention, the enzyme-treated milk-based substrate is not dried before being used as an ingredient in the dairy product.

In one embodiment of the invention, the dairy product is ice cream. In the present context, ice cream may be any kind of ice cream such as full fat ice cream, low fat ice cream, or ice cream based on yoghurt or other fermented milk products. Ice cream may be manufactured by any method known in the art.

In one embodiment of the invention, the dairy product is milk or condensed milk.

In one preferred embodiment of the invention, the dairy product is UHT milk. UHT milk in the context of the present invention is milk which has been subjected to a sterilization procedure which is intended to kill all microorganisms, including the bacterial spores. UHT (ultra high temperature) treatment may be, e.g., heat treatment for 30 seconds at 130° C., or heat treatment for one second at 145° C.

In one preferred embodiment of the invention, the dairy product is ESL milk. ESL milk in the context of the present invention is milk which has an extended shelf life due to microfiltration and/or heat treatment and which is able to stay fresh for at least 15 days, preferably for at least 20 days, on the store shelf at 2-5° C.

In another preferred embodiment of the invention, the dairy product is a fermented dairy product, e.g., yoghurt.

Fermented Dairy Product

A "fermented dairy product" in the context of the present invention is to be understood as any dairy product wherein any type of fermentation forms part of the production process. Examples of fermented dairy products are products like yoghurt, buttermilk, creme fraiche, quark and fromage frais. A fermented dairy product may be produced by any method known in the art.

"Fermentation" in the method of the present invention means the conversion of carbohydrates into alcohols or acids through the action of a microorganism. Preferably, fermentation in the method of the present invention comprises conversion of lactose to lactic acid.

In the context of the present invention, "microorganism" may include any bacterium or fungus being able to ferment the milk substrate.

The microorganisms used for most fermented milk products are selected from the group of bacteria generally referred to as lactic acid bacteria. As used herein, the term "lactic acid bacterium" designates a gram-positive, microaerophilic or anaerobic bacterium, which ferments sugars with the production of acids including lactic acid as the predominantly produced acid, acetic acid and propionic acid. The industrially most useful lactic acid bacteria are found within the order "Lactobacillales" which includes *Lactococcus* spp., *Streptococcus* spp., *Lactobacillus* spp., *Leuconostoc* spp., *Pseudoleuconostoc* spp., *Pediococcus* spp., *Brevibacterium* spp., *Enterococcus* spp. and *Propionibacterium* spp. Additionally, lactic acid producing bacteria belonging to the group of anaerobic bacteria, bifidobacteria, i.e. *Bifidobacterium* spp., which are frequently used as food cultures alone or in combination with lactic acid bacteria, are generally included in the group of lactic acid bacteria.

Lactic acid bacteria are normally supplied to the dairy industry either as frozen or freeze-dried cultures for bulk starter propagation or as so-called "Direct Vat Set" (DVS) cultures, intended for direct inoculation into a fermentation vessel or vat for the production of a fermented dairy product. Such cultures are in general referred to as "starter cultures" or "starters".

Commonly used starter culture strains of lactic acid bacteria are generally divided into mesophilic organisms having optimum growth temperatures at about 30° C. and thermophilic organisms having optimum growth temperatures in the range of about 40 to about 45° C. Typical organisms belonging to the mesophilic group include *Lactococcus lactis, Lactococcus lactis* subsp. *cremoris, Leuconostoc mesenteroides* subsp. *cremoris, Pseudoleuconostoc mesenteroides* subsp. *cremoris, Pediococcus pentosaceus, Lactococcus lactis* subsp. *lactis biovar. diacetylactis, Lactobacillus casei* subsp. *casei* and *Lactobacillus paracasei* subsp. *paracasei*. Thermophilic lactic acid bacterial species include as examples *Streptococcus thermophilus, Enterococcus faecium, Lactobacillus delbrueckii* subsp. *lactis, Lactobacillus helveticus, Lactobacillus delbrueckii* subsp. *bulgaricus* and *Lactobacillus acidophilus*.

Also the anaerobic bacteria belonging to the genus *Bifidobacterium* including *Bifidobacterium bifidum*, *Bifidobacterium animalis* and *Bifidobacterium longum* are commonly used as dairy starter cultures and are generally included in the group of lactic acid bacteria. Additionally, species of *Propionibacteria* are used as dairy starter cultures, in particular in the manufacture of cheese. Additionally, organisms belonging to the *Brevibacterium* genus are commonly used as food starter cultures.

Another group of microbial starter cultures are fungal cultures, including yeast cultures and cultures of filamentous fungi, which are particularly used in the manufacture of certain types of cheese and beverage. Examples of fungi include *Penicillium roqueforti*, *Penicillium candidum*, *Geotrichum candidum*, *Torula kefir*, *Saccharomyces kefir* and *Saccharomyces cerevisiae*.

In one embodiment of the present invention, the microorganism used for fermentation of the milk-based substrate is *Lactobacillus casei* or a mixture of *Streptococcus thermophilus* and *Lactobacillus delbrueckii* subsp. *bulgaricus*.

Fermentation processes to be used in a method of the present invention are well known and the person of skill in the art will know how to select suitable process conditions, such as temperature, oxygen, amount and characteristics of microorganism/s, additives such as e.g. carbohydrates, flavours, minerals, enzymes, and process time. Obviously, fermentation conditions are selected so as to support the achievement of the present invention.

As a result of fermentation, pH of the milk-based substrate will be lowered. The pH of a fermented dairy product of the invention may be, e.g., in the range 3.5-6, such as in the range 3.5-5, preferably in the range 3.8-4.8.

In a preferred embodiment, the fermented dairy product is yoghurt.

Method for Producing a Dairy Product

As mentioned above, the present invention in one aspect relates to a method for producing a dairy product comprising:
a) providing a milk-based substrate comprising lactose; and
b) treating said substrate with an enzyme having lactase activity and having an amino acid sequence which is at least 70% identical to amino acids 28-1931 of SEQ ID NO: 1 or a fragment thereof.

In a preferred aspect, the invention relates to a method for producing a dairy product comprising
a) providing a milk-based substrate comprising lactose; and
b) treating said substrate with an enzyme having lactase activity and having an amino acid sequence which is at least 70% identical to amino acids 28-1331 of SEQ ID NO: 2.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 3 or a fragment thereof.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 4 or a fragment thereof.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 5 or a fragment thereof.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 6 or a fragment thereof.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 7 or a fragment thereof.

In another aspect, the invention relates to a method for producing a dairy product comprising
a) providing a milk-based substrate comprising lactose, and
b) treating said substrate with an enzyme having lactase activity,
wherein step b) takes place at a temperature of at least 50° C.

In yet another aspect, the invention relates to a method for producing a dairy product comprising
a) providing a milk-based substrate comprising lactose,
b) treating said substrate with an enzyme having lactase activity, where the pH optimum of the lactase activity at 37° C. is above pH 5, and where the lactase activity of the enzyme at pH 5 is at least 50% of its lactase activity at pH 6 when measured at 37° C.

The skilled person will know how to determine the lactase activity at different pH and thereby determine the pH optimum for the enzyme. The lactase activity at different pH may be determined by measuring hydrolysis of lactose at 37° C. for 30 minutes, preferably in a buffer comprising succinate, HEPES, CHES, KCl, $CaCl_2$ and $MgCl_2$, e.g., by using a method as described in the Examples of the present application. For the avoidance of doubt, HEPES is a buffering agent, 4-(2-hydroxyethyl)-1-piperazineethanesulfonic acid, and CHES is a buffering agent, N-Cyclohexyl-2-aminoethanesulfonic acid.

The enzyme-treated milk-based substrate may optionally be mixed with other ingredients to obtain the dairy product. In one embodiment of the invention, the enzyme-treated milk-based substrate is mixed with other ingredients to obtain the dairy product.

In one embodiment of the invention, the dairy product is milk. In another embodiment, the dairy product is condensed milk. In another embodiment, the dairy product is ice cream. In another embodiment, the dairy product is UHT milk. In another embodiment, the dairy product is ESL milk. In yet another embodiment, the dairy product is a fermented dairy product, e.g., yoghurt.

Preferably, the dairy product is a low-lactose dairy product. "Low-lactose", in the context of the present invention, means that the amount of lactose in the dairy product, such as in the fermented dairy product, has been reduced by at least 70%, preferably 80%, 90%, 95%, 98%, 99% or 99.5%.

Method for Producing a Low-Lactose Fermented Dairy Product

One embodiment of the present invention relates to a method for producing a low-lactose fermented dairy product comprising
  a) providing a milk-based substrate comprising lactose,
  b) treating said substrate with an enzyme having lactase activity, where the lactase activity of the enzyme at pH 5 is at least 50% of its lactase activity at pH 6 when measured at 37° C., and
  c) fermenting said substrate with a microorganism.

Another embodiment of the invention relates to a method for producing a low-lactose fermented dairy product comprising
  a) providing a milk-based substrate comprising lactose,
  b) treating said substrate with an enzyme having lactase activity and having an amino acid sequence which is at least 70% identical to SEQ ID NO: 1, SEQ ID NO: 2, SEQ ID NO: 3, SEQ ID NO: 4, SEQ ID NO: 5, SEQ ID NO: 6, SEQ ID NO: 7, or a fragment of any of these, and
  c) fermenting said substrate with a microorganism.

Preferably, in these embodiments, step b) and step c) are performed essentially at the same time.

In the context of the method of the invention, "essentially at the same time" means that enzyme treatment and fermentation are not performed as separate steps, i.e., incubation of the milk-based substrate with the enzyme is not performed as a separate step before inoculation with the microorganism. Instead, the enzyme and the microorganism may be added to the milk-based substrate at essentially the same time. I.e., the enzyme may be added to the milk-based substrate immediately before inoculation with the microorganism. "Immediately before" in this context means without a separate incubation step for the enzymatic hydrolysis. Alternatively, the microorganism may be added immediately before the enzyme, or the microorganism and the enzyme may be added at the same time. "Essentially at the same time" in the context of the method of the invention may mean that the enzyme is active throughout the whole of step c).

"Essentially at the same time" does not mean that the enzymatic hydrolysis of the lactose in the milk-based substrate is completed when the fermentation is completed, i.e. when the pH has dropped to a level preventing further fermenting activity of the microbial starter culture.

In a preferred embodiment of the invention, the enzyme is still active after completion of step c). In a more preferred embodiment, the enzyme has retained at least 20%, such as at least 30%, at least 40%, at least 50%, at least 60% or at least 70%, of its lactase activity after completion of step c) as compared to its activity when added to the milk-based substrate.

After completion of step c) may mean when at least one of the below is true:
  temperature is lowered to below 30° C.
  pH has reached 4.55
  pH does no longer decrease by more than 0.2 units per hour.

In another preferred embodiment, less than 80%, such as less than 70%, less than 60%, less than 50%, less than 40%, less than 30% or less than 20%, of the lactose has been hydrolyzed after two hours of fermentation. "After two hours of fermentation" in the context of the invention means that the milk-based substrate, after having been inoculated with the microorganism, has been incubated for two hours at a temperature which is appropriate for the fermentation process.

In another preferred embodiment, less than 80%, such as less than 70%, less than 60%, less than 50%, less than 40%, less than 30% or less than 20%, of the lactose has been hydrolyzed when pH of the milk-based substrate has dropped to pH 5.

In yet another preferred embodiment, less than 80%, such as less than 70%, less than 60%, less than 50%, less than 40%, less than 30% or less than 20%, of the lactose has been hydrolyzed when step c) is completed.

In a preferred embodiment, more than 70%, such as more than 80%, more than 90%, more than 95%, more than 97%, more than 98% or more than 99%, of the lactose in the milk-based substrate has been hydrolyzed two days, i.e. 48 hours, after start of the fermentation. "Start of the fermentation" is when the milk-based substrate has been inoculated with the microorganism and incubated at a temperature which is appropriate for the fermentation process.

In another preferred embodiment, more than 70%, such as more than 80%, more than 90%, more than 95%, more than 97%, more than 98% or more than 99%, of the lactose in the milk-based substrate has been hydrolyzed two days, i.e. 48 hours, after completion of step c).

In another preferred embodiment, more than 70%, such as more than 80%, more than 90%, more than 95%, more than 97%, more than 98% or more than 99%, of the lactose in the milk-based substrate has been hydrolyzed in the final fermented dairy product. The "final fermented dairy product" is the fermented dairy product as sold to the consumer of the product.

In the embodiments of the invention where the milk-based substrate is being fermented, the enzyme treatment is preferably conducted at the natural pH of the milk-based substrate during the fermentation process, i.e. the pH will gradually decrease from the natural pH of the unfermented milk-based substrate to the pH of the fermented milk-based substrate. In such aspect, the enzyme treatment is preferably conducted at an appropriate temperature for the fermentation process.

Method for Producing a Low-Lactose Beverage Milk Product Having an Extended Shelf Life One embodiment of the present invention relates to a method for producing a low-lactose milk product comprising
  a) providing a milk-based substrate comprising lactose, and
  b) treating said substrate with an enzyme having lactase activity,
  wherein step b) takes place at a temperature of at least 60° C.

In a preferred embodiment, step b) takes place at a temperature of at least 62° C., such as at least 63° C., more preferred at a temperature of at least 64° C., such as at least 65° C., at least 67° C. or at least 70° C., and most preferred at a temperature of at least 75° C.

The low-lactose milk product may be beverage milk having a longer shelf life than fresh milk which normally has a shelf life of 4-7 days. It may have an improved quality as compared to other low-lactose beverage milk products having a longer shelf life. It may, e.g., have a lower microbial count, a less bitter taste and/or a less brown colour.

Preferably, the milk product is ESL milk. More preferably, the milk product is UHT milk.

In a preferred aspect, the milk-based substrate is raw milk. In another preferred aspect, the milk-based substrate, preferably raw milk, has not been pasteurized before step b).

In a preferred aspect, no pasteurization of the enzyme treated milk-based substrate is performed after step b).

In a preferred aspect, microfiltration of the milk-based substrate is performed before step b). In that case, the enzyme should preferentially be sterile. In another preferred aspect, microfiltration of the enzyme treated milk-based substrate is performed after step b).

In a preferred aspect, step b) is performed for between 10 minutes and 4 hours at a temperature of between 62° C. and 64° C. In a more preferred aspect, step b) is performed for between 20 minutes and 2 hours at a temperature of between 62° C. and 64° C. In an even more preferred aspect, step b) is performed for between 20 and 60 minutes, such as for about 30 minutes, at a temperature of about 63° C. Such simultaneous low pasteurization and lactase treatment of, e.g., raw milk will give rise to low-lactose beverage milk having a higher quality as compared to low-lactose beverage milk where lactase treatment has been performed at low temperature, e.g., at 5° C. for up to 24 hours as is often used in the dairy industry.

In a more preferred aspect, step b) is followed by cooling to below 10° C. without further heat treatment. This will allow for the enzyme to be still active after the milk has been cooled, i.e. during its storage. Preferably, less than 80% of the lactose has been hydrolyzed when step b) is completed, and more than 90% of the lactose has been hydrolyzed after one week. More preferably, less than 60% of the lactose has been hydrolyzed when step b) is completed, and more than 95% of the lactose has been hydrolyzed after one week In another more preferred aspect, step b) is followed by UHT treatment.

Enzyme Having Lactase Activity

In step b) in the methods of the present invention, the milk-based substrate is treated with an enzyme having lactase activity.

A lactase in the context of the present invention is any glycoside hydrolase having the ability to hydrolyse the disaccharide lactose into constituent galactose and glucose monomers. The group of lactases comprises but is not limited to enzymes assigned to subclass EC 3.2.1.108. Enzymes assigned to other subclasses, such as, e.g., EC 3.2.1.23, may also be lactases in the context of the present invention. A lactase in the context of the invention may have other activities than the lactose hydrolysing activity, such as for example a transgalactosylating activity. In the context of the invention, the lactose hydrolysing activity of the lactase may be referred to as its lactase activity or its beta-galactosidase activity.

Enzymes having lactase activity to be used in a method of the present invention may be of animal, of plant or of microbial origin. Preferred enzymes are obtained from microbial sources, in particular from a filamentous fungus or yeast, or from a bacterium.

The enzyme may, e.g., be derived from a strain of *Agaricus*, e.g. *A. bisporus*; *Ascovaginospora*; *Aspergillus*, e.g. *A. niger, A. awamori, A. foetidus, A. japonicus, A. oryzae*; *Candida*; *Chaetomium*; *Chaetotomastia*; *Dictyostelium*, e.g. *D. discoideum*; *Kluveromyces*, e.g. *K. fragilis, K. lactis*; *Mucor*, e.g. *M. javanicus, M. mucedo, M. subtilissimus*; *Neurospora*, e.g. *N. crassa*; *Rhizomucor*, e.g. *R. pusillus*; *Rhizopus*, e.g. *R. arrhizus, R. japonicus, R. stolonifer*; *Sclerotinia*, e.g. *S. libertiana*; *Torula*; *Torulopsis*; *Trichophyton*, e.g. *T. rubrum*; *Whetzelinia*, e.g. *W. sclerotiorum*; *Bacillus*, e.g. *B. coagulans, B. circulans, B. megaterium, B. novalis, B. subtilis, B. pumilus, B. stearothermophilus, B. thuringiensis*; *Bifidobacterium*, e.g. *B. longum, B. bifidum, B. animalis*; *Chryseobacterium*; *Citrobacter*, e.g. *C. freundii*; *Clostridium*, e.g. *C. perfringens*; *Diplodia*, e.g. *D. gossypina*; *Enterobacter*, e.g. *E. aerogenes, E. cloacae Edwardsiella, E. tarda*; *Erwinia*, e.g. *E. herbicola*; *Escherichia*, e.g. *E. coli*; *Klebsiella*, e.g. *K. pneumoniae*; *Miriococcum*; *Myrothesium*; *Mucor*; *Neurospora*, e.g. *N. crassa*; *Proteus*, e.g. *P. vulgaris*; *Providencia*, e.g. *P. stuartii*; *Pycnoporus*, e.g. *Pycnoporus cinnabarinus, Pycnoporus sanguineus*; *Ruminococcus*, e.g. *R. torques*; *Salmonella*, e.g. *S. typhimurium*; *Serratia*, e.g. *S. liquefasciens, S. marcescens*; *Shigella*, e.g. *S. flexneri*; *Streptomyces*, e.g. *S. antibioticus, S. castaneoglobisporus, S. violeceoruber*; *Trametes*; *Trichoderma*, e.g. *T. reesei, T. viride*; *Yersinia*, e.g. *Y. enterocolitica*.

In a preferred embodiment, the enzyme is a lactase from a bacterium, e.g. from the family Bifidobacteriaceae, such as from the genus *Bifidobacterium*, such as from a strain of *B. bifidum, B. animalis* or *B. longum*. In a more preferred embodiment, the enzyme is a lactase from *Bifidobacterium bifidum*. A preferred enzyme is a lactase having a sequence which is at least 50%, such as at least 60%, at least 70%, at least 80%, at least 90%, at least 95% or at least 98% identical to amino acids 28-1931 of SEQ ID NO: 1 or to a lactase active fragment thereof. Such lactase active fragment of SEQ ID NO: 1 may be any fragment of SEQ ID NO: 1 having lactase activity. A lactase active fragment of SEQ ID NO: 1 may be, e.g., amino acids 28-979, amino acids 28-1170, amino acids 28-1323, amino acids 28-1331, or amino acids 28-1600 of SEQ ID NO: 1.

In a preferred embodiment, an enzyme having lactase activity to be used in a method of the present invention comprises an amino acid sequence which is at least 50% identical to amino acids 28-1331 of SEQ ID NO: 2. In a more preferred embodiment, the enzyme comprises an amino acid sequence which is at least 60%, such as at least 70%, at least 80%, at least 90%, at least 95% or at least 98% identical to amino acids 28-1331 of SEQ ID NO: 2.

In another preferred embodiment, an enzyme having lactase activity to be used in a method of the present invention has an amino acid sequence which is at least 50% identical to amino acids 28-1331 of SEQ ID NO: 2. In a more preferred embodiment, the enzyme has an amino acid sequence which is at least 60%, such as at least 70%, at least 80%, at least 90%, at least 95% or at least 98% identical to amino acids 28-1331 of SEQ ID NO: 2.

In another embodiment, an enzyme having lactase activity to be used in a method of the present invention has an amino acid sequence which is at least 50% identical to SEQ ID NO: 3. Preferably, the enzyme has an amino acid sequence which is at least 60%, such as at least 70%, at least 80%, at least 90%, at least 95% or at least 98% identical to SEQ ID NO: 3.

In another embodiment, an enzyme having lactase activity to be used in a method of the present invention has an amino acid sequence which is at least 50% identical to SEQ ID NO: 4. Preferably, the enzyme has an amino acid sequence which is at least 60%, such as at least 70%, at least 80%, at least 90%, at least 95% or at least 98% identical to SEQ ID NO: 4.

In another embodiment, an enzyme having lactase activity to be used in a method of the present invention has an amino acid sequence which is at least 50% identical to SEQ ID NO: 5. Preferably, the enzyme has an amino acid sequence which is at least 60%, such as at least 70%, at least 80%, at least 90%, at least 95% or at least 98% identical to SEQ ID NO: 5.

In another embodiment, an enzyme having lactase activity to be used in a method of the present invention has an amino acid sequence which is at least 50% identical to SEQ ID NO: 6. Preferably, the enzyme has an amino acid sequence which is at least 60%, such as at least 70%, at least 80%, at least 90%, at least 95% or at least 98% identical to SEQ ID NO: 6.

In another embodiment, an enzyme having lactase activity to be used in a method of the present invention has an amino acid sequence which is at least 50% identical to SEQ ID NO: 7. Preferably, the enzyme has an amino acid sequence which is at least 60%, such as at least 70%, at least 80%, at least 90%, at least 95% or at least 98% identical to SEQ ID NO: 7.

For purposes of the present invention, the degree of identity between two amino acid sequences is determined using the Needleman-Wunsch algorithm (Needleman and Wunsch (1970) *J. Mol. Biol.* 48: 443-453) as implemented in the Needle program of the EMBOSS package (EMBOSS: The European Molecular Biology Open Software Suite, Rice et al. (2000) *Trends in Genetics* 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labelled "longest identity" (obtained using the—no brief option) is used as the percent identity and is calculated as follows:

(Identical Residues×100)/(Length of Alignment−
Total Number of Gaps in Alignment)

Lactases to be used in a method of the present invention may be extracellular. They may have a signal sequence at their N-terminus, which is cleaved off during secretion.

Lactases to be used in a method of the present invention may be derived from any of the sources mentioned herein. The term "derived" means in this context that the enzyme may have been isolated from an organism where it is present natively, i.e. the identity of the amino acid sequence of the enzyme are identical to a native enzyme. The term "derived" also means that the enzymes may have been produced recombinantly in a host organism, the recombinantly produced enzyme having either an identity identical to a native enzyme or having a modified amino acid sequence, e.g. having one or more amino acids which are deleted, inserted and/or substituted, i.e. a recombinantly produced enzyme which is a mutant and/or a fragment of a native amino acid sequence. Within the meaning of a native enzyme are included natural variants. Furthermore, the term "derived" includes enzymes produced synthetically by, e.g., peptide synthesis. The term "derived" also encompasses enzymes which have been modified e.g. by glycosylation, phosphorylation etc., whether in vivo or in vitro. With respect to recombinantly produced enzyme the term "derived from" refers to the identity of the enzyme and not the identity of the host organism in which it is produced recombinantly.

The lactase may be obtained from a microorganism by use of any suitable technique. For instance, a lactase enzyme preparation may be obtained by fermentation of a suitable microorganism and subsequent isolation of a lactase preparation from the resulting fermented broth or microorganism by methods known in the art. The lactase may also be obtained by use of recombinant DNA techniques. Such method normally comprises cultivation of a host cell transformed with a recombinant DNA vector comprising a DNA sequence encoding the lactase in question and the DNA sequence being operationally linked with an appropriate expression signal such that it is capable of expressing the lactase in a culture medium under conditions permitting the expression of the enzyme and recovering the enzyme from the culture. The DNA sequence may also be incorporated into the genome of the host cell. The DNA sequence may be of genomic, cDNA or synthetic origin or any combinations of these, and may be isolated or synthesized in accordance with methods known in the art.

Lactases to be used in a method of the present invention may be purified. The term "purified" as used herein covers lactase enzyme protein essentially free from insoluble components from the production organism. The term "purified" also covers lactase enzyme protein essentially free from insoluble components from the native organism from which it is obtained. Preferably, it is also separated from some of the soluble components of the organism and culture medium from which it is derived. More preferably, it is separated by one or more of the unit operations: filtration, precipitation, or chromatography.

Accordingly, the enzyme having lactase activity may be purified, viz. only minor amounts of other proteins being present. The expression "other proteins" relate in particular to other enzymes. The term "purified" as used herein also refers to removal of other components, particularly other proteins and most particularly other enzymes present in the cell of origin of the lactase. The lactase may be "substantially pure", i.e. free from other components from the organism in which it is produced, i.e., e.g., a host organism for recombinantly produced lactase. Preferably, the lactase is an at least 40% (w/w) pure enzyme protein preparation, more preferably at least 50%, 60%, 70%, 80% or even at least 90% pure.

The term enzyme having lactase activity includes whatever auxiliary compounds that may be necessary for the enzyme's catalytic activity, such as, e.g., an appropriate acceptor or cofactor, which may or may not be naturally present in the reaction system.

The enzyme may be in any form suited for the use in question, such as, e.g., in the form of a dry powder or granulate, a non-dusting granulate, a liquid, a stabilized liquid, or a protected enzyme.

The enzyme is added in a suitable amount to achieve the desired degree of lactose hydrolysis under the chosen reaction conditions. The enzyme may be added at a concentration of between 100 and 5000 LAU per liter milk-based substrate, preferably less than 3000, such as less than 1500, less than 1000, less than 750 or less than 500, LAU per liter milk-based substrate.

In a preferred embodiment, the enzyme is added at a concentration of between 5 and 100 LAU per g lactose in the milk-based substrate, preferably less than 50, such as less than 40, less than 30, less than 20 or less than 10, LAU per g lactose in the milk-based substrate.

In the context of the present application, 1 lactase unit (1 LAU) is the amount of enzyme which releases 1 micromole glucose per minute in M-buffer at pH 6.5 and 37° C. with a lactose concentration of 4.75% w/v. M-buffer is prepared by dissolving 3.98 g $C_6H_5Na_3O_7$-$2H_2O$, 8.31 g citric acid, 0.9 g $K_2SO_4$, 2.6 g $K_2HPO_4$, 7.35 g $KH_2PO_4$, 5.45 g KOH, 4.15 g $MgCl_2$-$6H_2O$, 3.75 g $CaCl_2$-$2H_2O$ and 1.4 g $NaHCO_3$ in 4 liter water, adding 12.5 ml 4N NaOH, adjusting to pH 6.5 using HCl, and adding water up to a total volume of 5 liter.

The activity in LAU of a specific lactase may be determined by direct measurement of glucose released from lactose under the conditions described above. The skilled person will know how to determine such activity. Alternatively, the activity may be determined by using the lactase activity assay described in Example 1 of the present application. Here, the activity is obtained by comparing to a standard curve run with a lactase of known activity, and the activity of the unknown sample calculated from this. The lactase of known activity may, e.g., be Lactozym obtained from Novozymes A/S, Denmark.

In a preferred embodiment, the enzyme having lactase activity to be used in a method of the present invention has a lactase activity at 37° C. and pH 5 which is at least 55%, such as at least 60%, at least 65%, at least 70% or at least 75%, of its lactase activity at 37° C. and pH 6.

In another preferred embodiment, the enzyme having lactase activity to be used in a method of the present invention has a lactase activity at 37° C. and pH 4.5 which is at least 10%, such as at least 20%, at least 30%, at least 35% or at least 40%, of its lactase activity at 37° C. and pH 6.

In another preferred embodiment, the enzyme having lactase activity to be used in a method of the present invention has a pH optimum of the lactase activity at 37° C. which is above pH 5.5.

In another preferred embodiment, the enzyme having lactase activity to be used in a method of the present invention has a lactase activity at a temperature of 52° C. and a pH of 6.5 which is at least 50%, such as at least 55%, at least 60%, at least 65%, at least 70%, at least 75% or at least 80%, of its lactase activity at a temperature of 38° C. and a pH of 6.5.

The skilled person will know how to determine the lactase activity at different pH and temperature. The lactase activity at different pH and temperature is preferably determined by using a method as described in the Examples of the present application.

In a preferred embodiment of the present invention, Km of the enzyme having lactase activity at 5° C. is below 25 mM, such as below 20 mM, below 15 mM or below 10 mM. In another preferred embodiment, Km of the enzyme having lactase activity at 37° C. is below 25 mM, such as below 20 mM or below 15 mM. The skilled person will know how to determine Km for the lactase activity at a specific temperature. Km may be determined by the method used in the Examples of the present application.

In another preferred embodiment, the enzyme when hydrolysing the lactose in the milk-based substrate has a ratio of lactase to transgalactosylase activity of more than 1:1, such as more than 2:1 or more than 3:1. In another preferred embodiment, the enzyme treatment is performed under conditions where the lactase activity of the enzyme is higher than the transgalactosylase activity, such as at least two times higher or at least three times higher. The ratio of lactase to transgalactosylase activity in the milk-based substrate may, e.g., be determined by HPLC analysis. In another preferred embodiment, the enzyme treatment is performed under conditions where at least 50% (w/w %) of the hydrolyzed lactose is converted into free galactose. In another preferred embodiment, the enzyme treatment is performed under conditions where the hydrolyzed lactose is converted into equal amounts of free glucose and free galactose.

EXAMPLE 1

Lactase Activity—Assay in Eppendorf Tubes at 37° C., pH 6.5

Principle:

Lactase hydrolyses lactose into glucose and galactose. Glucose is measured after a modified version of the common glucose oxidase/peroxidase assay (Werner, W. et al. (1970) Z. analyt. Chem. 252: 224.).

LAU is defined as the amount of enzyme liberating 1 micromole of glucose per min at 37° C., pH 6.5 in M-buffer (M-buffer is defined in the description of the present patent application). Alternatively, the activity in LAU for a specific lactase may be determined by the method described here. The value obtained is compared to a standard curve run with a lactase of known activity, and the activity of the unknown sample calculated from this. The lactase of known activity may, e.g., be Lactozym obtained from Novozymes A/S, Denmark.

Solutions:

Assay buffer: 50 mM succinate, 50 mM HEPES, 50 mM CHES, 150 mM KCl, 2 mM $CaCl_2$, 1 mM $MgCl_2$, 0.01% Triton X100, pH 6.5

GOD-Perid solution: 65 mM sodium phosphate, pH 7, 0.4 g/l Glucose oxidase, 0.013 g/l HRP (Horse Radish Peroxidase), 0.65 g/l ABTS (2,2'-azino-bis(3-ethylbenzthiazoline-6-sulphonic acid)).

Substrate:

160 mM lactose, 50 mM succinate, 50 mM HEPES, 50 mM CHES, 150 mM KCl, 2 mM $CaCl_2$, 1 mom $MgCl_2$, pH 6.5.

Standard:

Lactozym (available from Novozymes A/S, Denmark) with a known activity in LAU/g is used as standard, diluted in assay buffer in the range from 0.09-0.7 LAU/g.

Samples:

Enzyme samples are diluted appropriately in assay buffer.

Procedure:

1. 375 ul substrate is incubated 5 minutes at 37° C.
2. 25 ul enzyme diluted in assay buffer is added.
3. The reaction is stopped after 30 minutes by adding 60 ul 1 M NaOH
4. 20 ul is transferred to a 96 well microtiter plate and 200 ul GOD-Perid solution is added.

After 30 minutes at room temperature, the absorbance is measured at 420 nm.

EXAMPLE 2

100 ml 9% skimmed milk solution having approximately 5% lactose was made by mixing 9 g skimmed milk powder (Kerry) in 91 ml ionic water. 10 ml of the solution was transferred to a test tube containing a magnetic stirring bar and placed in a water bath at 37° C. After 15 min enzyme was added. Enzymes tested were Lactozym, a commercially available lactase from Novozymes A/S, Denmark, having an activity of 3060 LAU/g, and an experimental lactase from *Bifidobacterium bifidum* having the encoded sequence shown in SEQ ID NO: 2 and an activity of 295 LAU/g. Amino acids 1 to 27 of SEQ ID NO: 2 is a signal sequence which is presumably cleaved off and amino acids 1332 to 1341 is a tag used for purification of the experimental enzyme.

Dosages were 5640 LAU/l milk of Lactozym and 2700 LAU/l milk of the *Bifidobacterium* lactase. Milk samples were taken at regular intervals up till 4 hrs. and the enzyme inactivated by heating to 99° C. for 10 min in a thermomixer. Samples were diluted appropriately and filtered through a 0.20 um filter.

Lactose hydrolysis was measured using a Dionex BioLC equipped with a Dionex PA1 column and a Pulsed Amperiometrisk Detektor (PAD). Peaks were identified and quantified by comparing with known standards of lactose, glucose and galactose. Results are given below.

TABLE 1

Lactose, glucose and galactose in reconstituted skimmed milk after treatment with Lactozym or *Bifidobacterium* lactase.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 5 | 152 | 6 | 5 | 156 | 3 | 3 |
| 30 | 64 | 92 | 76 | 91 | 71 | 70 |
| 60 | 35 | 118 | 99 | 45 | 117 | 114 |
| 120 | 19 | 131 | 111 | 8 | 144 | 142 |
| 180 | 15 | 141 | 119 | 1 | 155 | 153 |
| 240 | 14 | 150 | 128 | 1 | 162 | 160 |

When tested in milk with 5% lactose, no transferase activity is observed when using the *Bifidobacterium* lactase. Glucose and galactose production are equal and total monosaccharide production match that expected from the lactose hydrolyzed. For comparison, Lactozym produces less galactose than glucose clearly showing that galactooligosaccharides have been produced. Also, final lactose levels are significantly lower when using the *Bifidobacterium* lactase illustrating the lower Km value of this enzyme.

EXAMPLE 3

100 ml 15 or 30% (w/w) whey permeate containing primarily lactose and ions was made by mixing 15 or 30 g spray-dried whey permeate powder (Variolac, Arla) in 85 or 70 ml ionic water respectively. The solution was poured in a flask containing a magnetic stirring bar and placed in a water bath at 37° C. After 15 min, enzyme was added. Enzymes tested were Lactozym, a commercially available lactase from Novozymes A/S, Denmark, having an activity of 3060 LAU/g, and an experimental lactase from *Bifidobacterium bifidum* having the encoded sequence shown in SEQ ID NO: 2 and an activity of 295 LAU/g.

Dosages were 4225 LAU/l milk of Lactozym and 2025 LAU/l milk of the *Bifidobacterium* lactase. Milk samples were taken at regular intervals up till 5.5 hrs. and the enzyme inactivated by heating to 99° C. for 10 min in a thermomixer. Samples were diluted appropriately and filtered through a 0.20 um filter.

Lactose hydrolysis was measured using a Dionex BioLC equipped with a Dionex PA1 column and a Pulsed Amperiometrisk Detektor (PAD). Peaks were identified and quantified by comparing with known standards of lactose, glucose and galactose.

Results are given below.

TABLE 2

Lactose, glucose and galactose in 15% DS whey permeate after treatment with Lactozym or *Bifidobacterium* lactase.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 0 | 499 | 1 | 2 | 499 | 1 | 2 |
| 30 | 312 | 135 | 106 | 410 | 61 | 63 |
| 60 | 211 | 224 | 155 | 349 | 119 | 122 |
| 120 | 110 | 295 | 221 | 220 | 199 | 202 |
| 180 | 66 | 324 | 249 | 149 | 281 | 290 |
| 240 | 50 | 346 | 279 | 84 | 336 | 348 |
| 330 | 37 | 372 | 312 | 31 | 350 | 368 |

TABLE 3

Lactose, glucose and galactose in 30% DS whey permeate after treatment with Lactozym or *Bifidobacterium* lactase.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 0 | 848 | 1 | 4 | 848 | 1 | 4 |
| 30 | 824 | 109 | 75 | 819 | 43 | 45 |
| 60 | 615 | 253 | 150 | 788 | 86 | 83 |
| 120 | 420 | 370 | 242 | 651 | 159 | 158 |
| 180 | 291 | 459 | 300 | 625 | 232 | 230 |
| 240 | 246 | 559 | 373 | 501 | 283 | 273 |
| 330 | 154 | 544 | 367 | 391 | 333 | 324 |
| 1440 | 54 | 649 | 545 | 20 | 727 | 739 |

Also when tested at higher lactose concentrations as in 15% or 30% whey permeate no or very little galactooligosaccharides are produced. Again, the produced galactose and glucose levels are equal and match the amount of lactose hydrolyzed. For comparison, Lactozym produces less galactose than glucose, clearly showing that galactooligosaccharides have been produced.

EXAMPLE 4 pH profile (at 37° C.) and temperature profile (at pH 6.5) of experimental lactase from *Bifidobacterium bifidum* using lactose as substrate.

Principle:

Lactase hydrolyses lactose and glucose+galactose is formed. Glucose is measured after a modified version of the common glucose oxidase/peroxidase assay (Werner, W. et al. (1970) Z. analyt. Chem. 252: 224.)

pH Profile

Substrate:

167 mM lactose, 50 mM succinate, 50 mM HEPES, 50 mM CHES, 150 mM KCl, 2 mM $CaCl_2$, 1 mM $MgCl_2$ and pH adjusted to pH 3, 4, 5, 6, 7, 8, 9 and 10 with NaOH.

Enzyme Sample:

Experimental lactase from *Bifidobacterium bifidum* having the encoded sequence shown in SEQ ID NO: 2 was diluted appropriately in 150 mM KCl, 2 mM $CaCl_2$, 1 mM $MgCl_2$, 0.01% Triton X100.

Procedure:

10 ul enzyme sample diluted in enzyme dilution buffer was added to PCR tubes at room temp.

90 ul substrate was added at room temp. and quickly placed in a Peltier Thermal Cycler (PCT-200, MJ research) at 37° C. and incubated for 30 min and then placed on ice.

The reaction was stopped by adding 100 ul 0.25 M NaOH.

20 ul was transferred to a 96 well microtitre plate and 230 ul 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.

TABLE 4

| pH | *B. bifidum* lactase relative activity (% of activity at pH 6) |
|---|---|
| 3 | 0 |
| 4 | 4 |
| 5 | 75 |
| 6 | 100 |

TABLE 4-continued

| pH | B. bifidum lactase relative activity (% of activity at pH 6) |
|---|---|
| 7 | 85 |
| 8 | 39 |
| 9 | 10 |
| 10 | 4 |

Temperature Profile
Substrate:
167 mM lactose, 50 mM succinate, 50 mM HEPES, 50 mM CHES, 150 mM KCl, 2 mM $CaCl_2$, 1 mM $MgCl_2$ and pH adjusted to pH 6.5 with NaOH.
Enzyme Sample:
Experimental lactase from *Bifidobacterium bifidum* having the encoded sequence shown in SEQ ID NO: 2 was diluted appropriately in 50 mM succinate, 50 mM HEPES, 50 mM CHES, 150 mM KCl, 2 mM $CaCl_2$, 1 mM $MgCl_2$, 0.01% Triton X100 and pH adjusted to pH 6.5.
Procedure:
10 ul enzyme sample diluted in enzyme dilution buffer was added to PCR tubes at room temp.
90 ul preheated (in a Peltier Thermal Cycler 30-70° C.) substrate was added and incubation was performed with a temp. gradient from 30-70° C. for 30 min. and then placed on ice.
The reaction was stopped by adding 100 ul 0.25 M NaOH.
20 ul was transferred to a 96 well microtitre plate and 230 ul 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.

TABLE 5

| Temp. ° C. | B. bifidum lactase relative activity (% of activity at 38.1° C.) |
|---|---|
| 20 | 54 |
| 21 | 63 |
| 22 | 64 |
| 24 | 68 |
| 26 | 73 |
| 29 | 81 |
| 31 | 88 |
| 34 | 94 |
| 36 | 96 |
| 38 | 100 |
| 43 | 96 |
| 48 | 91 |
| 52 | 83 |
| 57 | 76 |
| 62 | 58 |
| 66 | 32 |
| 69 | 20 |
| 70 | 17 |

EXAMPLE 5

Determination of Km for lactase enzymes at 5° C.
Principle:
Lactase hydrolyses lactose and glucose+galactose is formed. Glucose is measured after a modified version of the common glucose oxidase/peroxidase assay (Werner, W. et al. (1970) *Z. analyt. Chem.* 252: 224.)
Substrate:
Different lactose concentrations ranging from Km/5 to 10*Km, 50 mM succinate, 50 mM HEPES, 50 mM CHES, 150 mM KCl, 2 mM $CaCl_2$, 1 mM $MgCl_2$ and pH adjusted to pH 6.5 with NaOH.

Enzyme Sample:
Experimental lactase from *Bifidobacterium bifidum* having the encoded sequence shown in SEQ ID NO: 2 was diluted appropriately in 50 mM succinate, 50 mM HEPES, 50 mM CHES, 150 mM KCl, 2 mM $CaCl_2$, 1 mM $MgCl_2$, 0.01% Triton X100, pH adjusted to pH 6.5 with NaOH.
12 g/l Lactozym (commercially available lactase from Novozymes A/S, Denmark) was diluted 6000 times in the same buffer.
Procedure:
10 ul enzyme sample (5° C.) was added to a 96 well microtitre plate on ice.
90 ul substrate (5° C.) was added and incubated for 2 hours at 5° C.
The reaction was stopped by adding 100 ul 0.25 M NaOH.
20 ul was transferred to a 96 well microtitre plate and 230 ul 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.
Km Determination:
Computerized nonlinear least-squares fitting and the Michaelis-Menten equation:

$$v=(V\text{max}*S)/(Km+S)$$

was used. Km for the *Bifidobacterium* lactase and Lactozym were determined to be 8 mM and 30 mM, respectively.
In a similar test performed at 37° C., Km for the *Bifidobacterium* lactase and Lactozym were determined to be 13 mM and 30 mM, respectively.

EXAMPLE 6

Yoghurt Trials
Commercial homogenized milk with 1.5% fat was pasteurized at 90° C. for 20 min. 200 ml of the milk was transferred into baby bottles and tempered to 43° C. The milk was inoculated with a frozen probiotic yoghurt culture from Chr. Hansen, Denmark, (F-DVS ABY-3) using an inoculation level of 0.02%. At the same time, enzyme was added to the milk. Enzyme products tested were Ha-lactase, a commercially available lactase from Chr. Hansen, Denmark, having an activity of 8021 LAU/g and an experimental lactase from *Bifidobacterium bifidum* having the encoded sequence shown in SEQ ID No. 2 and an activity of 295 LAU/g.
Dosages were 1500, 3000 and 3750 LAU/L milk of Ha-lactase and 710, 1420, and 1780 LAU/L of the *Bifidobacterium* lactase. The milk samples were fermented at 43° C. until pH reached 4.55 within approximately five hours. The yoghurts were then stirred, cooled to 25° C. and placed at 8° C. for storage. Samples were collected 2 hours after addition of culture and enzyme, at end pH (pH 4.55) and after 20-24 hours (Day 1) of storage at 8° C. The biological activity was stopped by addition of sulphuric acid. Proteins were precipitated adding perchloric acid and MQW containing standards were then added.
Lactose hydrolysis was measured using a Dionex ICS-3000 system equipped with a Carbopac20 connected with an electrochemical detector (ED). Peaks were identified and quantified by comparing with known standards of lactose, glucose and galactose. Results for lactose hydrolysis are given below.

TABLE 6

Lactose in yoghurt treated with different dosages of Ha-lactase or *Bifidobacterium* lactase. A reference sample with no addition of enzyme was also tested Lactose (mg/g)

| | | HA-lactase | | | *Bifidobacterium* lactase | | |
|---|---|---|---|---|---|---|---|
| Time | Reference No lactase | 1500 LAU/L | 3000 LAU/L | 3750 LAU/L | 710 LAU/L | 1420 LAU/L | 1780 LAU/L |
| Initial | 56.0 | | | | | | |
| 2 h | 48.4 | 13.3 | 3.4 | 2.6 | 29.6 | 10.2 | 5.7 |
| End pH | 39.0 | 10.9 | 2.5 | 1.9 | 8.7 | 0.6 | 0.6 |
| Day 1 | 39.3 | 10.5 | 2.4 | 1.8 | 3.4 | 0.5 | 0.5 |

The level of lactose in the yoghurt samples show that Ha-lactase has highest activity in the beginning of the fermentation, during the first two hours of fermentation. After two hours Ha-lactase is clearly inactivated, due to the lowering of pH. The *Bifidobacterium* lactase, on the other hand, stays active during the whole fermentation and also to some extent during cold storage. At the lowest tested dosage of 710 LAU/L, the lactose level is significantly reduced during cold storage when using the *Bifidobacterium* lactase.

EXAMPLE 7

Yoghurt Trials

Commercial homogenized milk with 1.5% fat was pasteurized at 90° C. for 20 min. 200 ml of the milk was transferred into baby bottles and tempered to 43° C. The milk was inoculated with a frozen probiotic yoghurt culture from Chr. Hansen, Denmark, (F-DVS ABY-3) using an inoculation level if 0.02%. At the same time enzyme was added to the milk. Enzyme products tested were Ha-lactase, a commercially available lactase from Chr. Hansen, Denmark, having an activity of 8021 LAU/g and an experimental lactase from *Bifidobacterium bifidum* having the encoded sequence shown in SEQ ID No. 2 and an activity of 295 LAU/g.

Dosage was 1500 LAU/L milk of Ha-lactase and 710, 530 and 360 LAU/L of the *Bifidobacterium* lactase. The milk samples were fermented at 43° C. until pH reached 4.55 within approximately five hours. The yoghurts were then stirred, cooled to 25° C. and placed at 8° C. for storage. Samples were collected 2 hours after addition of culture and enzyme, at end pH (pH4.55) and after 1, 2, 3 and 7 days of storage at 8° C. The biological activity was stopped by addition of sulphuric acid. Proteins were precipitated adding perchloric acid and MQW containing standards was then added.

Lactose hydrolysis was measured using a Dionex ICS-3000 system equipped with a Carbopac20 connected with an electrochemical detector (ED). Peaks were identified and quantified by comparing with known standards of lactose, glucose and galactose. Results for lactose hydrolysis are given below.

TABLE 7

Lactose (mg/g)

| | | Ha-lactase 1500 | *Bifidobacterium* lactase | | |
|---|---|---|---|---|---|
| Time | No lactase | LAU/L | 710 LAU/L | 530 LAU/L | 360 LAU/L |
| Initial | 47.9 | | | | |
| 2 h | 45.8 | 4.7 | 21.2 | 24.2 | 29.6 |
| End pH | 35.5 | 2.3 | 0.8 | 3.8 | 9.6 |
| Day 1 | 33.7 | 3.1 | 0.2 | 0.8 | 4.7 |
| Day 2 | | 2.7 | 0.5 | 0.7 | 2.9 |
| Day 3 | | 2.6 | 0.3 | 0.2 | 1.5 |
| Day 7 | | 2.6 | 0.1 | 0.2 | 0.3 |

As described in the previous example, the activity period of the two enzymes tested differs. Ha-lactase shows high activity at the start of fermentation whereas the *Bifidobacterium* lactase stays active during the whole fermentation time and also during cold storage. Hence, after two days of storage the lactose level is similar or lower in samples with the *Bifidobacterium* lactase compared to the Ha-lactase.

Similar degrees of lactose hydrolysis are obtained day 2 in the yoghurts samples with 1500 LAU/L Ha-lactase and yoghurt samples with 360 LAU/L *Bifidobacterium* lactase.

EXAMPLE 8

Milk Trials

Commercial homogenized milk with 1.5% fat was transferred to tubes (10 ml) and heated in water baths to 40° C., 50° C. and 55° C., respectively. Enzyme was then added to the milk samples. Enzyme products tested were Ha-lactase, a commercially available lactase from Chr. Hansen, Denmark, having an activity of 8040 LAU/g and an experimental lactase from *Bifidobacterium bifidum* having the encoded sequence shown in SEQ ID No. 2 and an activity of 295 LAU/g.

Dosage was 1500 LAU/L milk of Ha-lactase and 710 LAU/L of the *Bifidobacterium* lactase. Samples were collected 2 hours and 4 hours after addition of the enzyme. The biological activity was stopped by addition of sulphuric acid. Proteins were precipitated adding perchloric acid and MQW containing standards was then added.

Lactose hydrolysis was measured using a Dionex ICS-3000 system equipped with a Carbopac20 connected with an electrochemical detector (ED). Peaks were identified and quantified by comparing with known standards of lactose, glucose and galactose. Results for lactose hydrolysis are given below.

TABLE 8

Lactose (mg/g)

| | Reference | HA-lactase-1500 LAU/L | | | *Bifidobacterium* lactase-710 LAU/L | | |
|---|---|---|---|---|---|---|---|
| Time | No lactase | 40° C. | 50° C. | 55° C. | 40° C. | 50° C. | 55° C. |
| 2 h | 46.5 | 24.0 | 34.9 | 40.6 | 29.3 | 21.0 | 31.7 |
| 4 h | 46.5 | 19.8 | 37.3 | 39.6 | 12.5 | 11.2 | 25.6 |

At the highest temperatures, 50° C. and 55° C., the *Bifidobacterium* lactase shows significantly higher activity compared to the Ha-lactase. Furthermore, the *Bifidobacterium* lactase stays active during the 4 hour reaction time, whereas no or only very low activity is observed for the Ha-lactase.

EXAMPLE 9

Milk Trials—High Temperature

Commercial homogenized milk with 1.5% fat was transferred to tubes (10 ml) and tempered to 63° C. Enzyme was added to the milk samples. Enzyme products tested were Ha-lactase 5200, a commercially available lactase from Chr. Hansen (Denmark) having an activity of 8040 LAU/g and Lactoles, a commercial Bacillus lactase from Daiwa Kasei (Japan) having an activity of approximately 1500 LAU/g.

Applied dosages were 1500 LAU/L milk of Ha-lactase and Lactoles, respectively. At 63° C. samples were collected 15 minutes, 30 minutes, 2 hours and 4 hours after addition of the enzyme. The enzymatic activity in the samples was stopped by addition of sulphuric acid and proteins precipitated by addition of perchloric acid before HPLC analysis.

Lactose hydrolysis was measured using a Dionex ICS-3000 system equipped with a Carbopac20 connected with an electrochemical detector (ED). Peaks were identified and quantified by comparing with known standards of lactose, glucose and galactose. Results for lactose hydrolysis are given below.

TABLE 9

| | Lactose (mg/g) | | |
|---|---|---|---|
| Time | Reference- No lactase | HA-lactase 5200- 1500 LAU/L | Lactoles- 1500 LAU/L |
| 15 min. | 48.9 | 44.6 | 22.7 |
| 30 min. | 48.9 | 44.9 | 22.1 |
| 2 h | 48.9 | 44.0 | 6.7 |
| 4 h | 48.9 | 43.2 | 3.2 |

At 63° C. Ha-lactase 5200 is inactivated as no hydrolysis takes place during 4 hours of reaction. On the other hand, Lactoles shows high activity at this temperature during the whole reaction time. After 4 hours, a degree of hydrolysis of 93.4% is obtained.

EXAMPLE 10

100 ml 9% skimmed milk solution having approximately 5% lactose was made by mixing 9 g skimmed milk powder (Kerry) in 91 ml ionic water. 10 ml of the solution was transferred to a test tube containing a magnetic stirring bar and placed in a water bath at 5° C. After 15 min enzyme was added. Enzymes tested were Lactozym, a commercially available lactase from Novozymes A/S, Denmark, having an activity of 3060 LAU/g, and an experimental lactase from Bifidobacterium bifidum having the encoded sequence shown in SEQ ID NO: 2 and an activity of 295 LAU/g. Amino acids 1 to 27 of SEQ ID NO: 2 is a signal sequence which is presumably cleaved off and amino acids 1332 to 1341 is a tag used for purification of the experimental enzyme.

Dosages were 3000 LAU/l milk of Lactozym and 1420 LAU/l milk of the Bifidobacterium lactase. Milk samples were taken at regular intervals up till 48 hrs. and the enzyme inactivated by heating to 99° C. for 10 min in a thermomixer. Samples were diluted appropriately and filtered through a 0.20 um filter.

Lactose hydrolysis was measured using a Dionex BioLC equipped with a Dionex PA1 column and a Pulsed Amperiometrisk Detektor (PAD). Peaks were identified and quantified by comparing with known standards of lactose, glucose and galactose. Results are given below.

TABLE 10

Lactose, glucose and galactose in reconstituted skimmed milk after treatment with Lactozym or Bifidobacterium lactase at 5° C.

| | Lactozym | | | Bifidobacterium lactase | | |
|---|---|---|---|---|---|---|
| Time min | Lactose mM | Glucose mM | Galactose mM | Lactose mM | Glucose mM | Galactose mM |
| 125 | — | — | — | 110 | 28 | 31 |
| 240 | 87 | 64 | 60 | — | — | — |
| 360 | — | — | — | 70 | 65 | 67 |
| 460 | 62 | 104 | 91 | 55 | 74 | 76 |
| 1410 | 18 | 152 | 134 | 13 | 149 | 148 |
| 1620 | 13 | 137 | 125 | 7 | 139 | 140 |
| 1865 | 10 | — | — | 5 | 167 | 167 |
| 2870 | 6 | 141 | 132 | 0.7 | 139 | 140 |

When tested in milk with 5% lactose at 5° C. again no transferase activity is observed when using the Bifidobacterium lactase. Glucose and galactose production are equal and total monosaccharide production match that expected from the lactose hydrolyzed. For comparison, Lactozym produces less galactose than glucose clearly showing that galactooligosaccharides have been produced. Also, final lactose levels are significantly lower when using the Bifidobacterium lactase further illustrating the lower Km value of this enzyme.

The invention claimed is:

1. A polypeptide having transgalactosylating activity, which is a truncated polypeptide consisting of the amino acid sequence of amino acids 28-979 of SEQ ID NO: 1 or is a fragment thereof having transgalactosylating activity.

2. The polypeptide of claim 1, wherein the truncated polypeptide consists of the amino acid sequence of amino acids 28-979 of SEQ ID NO: 1.

3. The polypeptide of claim 1, wherein the truncated polypeptide consists of the amino acid sequence of a fragment of amino acids 28-979 of SEQ ID NO: 1.

4. A composition comprising the polypeptide of claim 1.

5. The composition of claim 4, which is a food composition.

6. The composition of claim 5, which is a dairy product.

7. A method for producing a food product, comprising treating a substrate comprising lactose with the polypeptide of claim 1.

8. A method for producing a dairy product, comprising treating a milk-based substrate comprising lactose with the polypeptide of claim 1.

9. A method for producing galacto-oligosaccharides, comprising contacting the polypeptide of claim 1 with a milk-based substrate comprising lactose.

10. A method for producing galacto-oligosaccharides, comprising contacting the polypeptide of claim 2 with a milk-based substrate comprising lactose.

11. A polypeptide having transgalactosylating activity, which is a fragment having an amino acid sequence which is at least 98% identical to amino acids 28-979 of SEQ ID NO: 1, wherein the fragment consists of at most 952 amino acid residues and has transgalactosylating activity.

12. A composition comprising the polypeptide of claim 11.

13. The composition of claim 12, which is a food composition.

14. The composition of claim 13, which is a dairy product.

15. A method for producing a food product, comprising treating a substrate comprising lactose with the polypeptide of claim 11.

16. A method for producing a dairy product, comprising treating a milk-based substrate comprising lactose with the polypeptide of claim 11.

17. A method for producing galacto-oligosaccharides, comprising contacting the polypeptide of claim 11 with a milk-based substrate comprising lactose.

* * * * *